US008368690B1

(12) United States Patent
Hoppenstein et al.

(10) Patent No.: US 8,368,690 B1
(45) Date of Patent: Feb. 5, 2013

(54) CALIBRATOR FOR AUTOSTEREOSCOPIC IMAGE DISPLAY

(75) Inventors: Reuben Hoppenstein, New Rochelle, NY (US); Eric Rosenthal, Morganville, NJ (US)

(73) Assignee: 3-D Virtual Lens Technologies, Inc., New York, NY (US)

( * ) Notice: Subject to any disclaimer, the term of this patent is extended or adjusted under 35 U.S.C. 154(b) by 0 days.

(21) Appl. No.: 13/506,799

(22) Filed: May 17, 2012

Related U.S. Application Data

(60) Provisional application No. 61/571,815, filed on Jul. 5, 2011, provisional application No. 61/571,811, filed on Jul. 5, 2011, provisional application No. 61/571,813, filed on Jul. 5, 2011, provisional application No. 61/571,812, filed on Jul. 5, 2011.

(51) Int. Cl.
*G06T 15/00* (2011.01)

(52) U.S. Cl. .......................................... 345/419; 348/42

(58) Field of Classification Search .................. 345/419; 348/42
See application file for complete search history.

(56) References Cited

U.S. PATENT DOCUMENTS

| | | |
|---|---|---|
| 1,128,979 A | 2/1916 | Hess |
| 4,448,490 A | 5/1984 | Shibuya et al. |
| 5,124,818 A | 6/1992 | Conner et al. |
| 5,315,377 A | 5/1994 | Isono et al. |
| 5,689,283 A | 11/1997 | Shirochi |
| 5,825,541 A | 10/1998 | Imai |
| 5,838,494 A | 11/1998 | Araki |
| 6,040,807 A | 3/2000 | Hamagishi et al. |
| 6,061,424 A | 5/2000 | Hoppenstein et al. |
| 6,195,205 B1 | 2/2001 | Faris |
| 6,421,174 B1 | 7/2002 | Ooshima et al. |
| 6,690,346 B1 | 2/2004 | Hanano |
| 7,324,276 B2 | 1/2008 | Wood |
| 7,404,642 B2 | 7/2008 | Shestak et al. |
| 7,513,623 B2 | 4/2009 | Thomas |
| 7,679,616 B2 | 3/2010 | Nomura et al. |
| 7,715,618 B2 | 5/2010 | Shioi et al. |
| 7,874,678 B2 | 1/2011 | Hines |
| 8,038,316 B2 | 10/2011 | Silverstein et al. |
| 2002/0118452 A1 | 8/2002 | Taniguchi et al. |
| 2004/0012851 A1 | 1/2004 | Sato et al. |
| 2005/0225563 A1 | 10/2005 | Brown Elliott et al. |
| 2006/0256302 A1 | 11/2006 | Hsu |
| 2007/0146876 A1 | 6/2007 | Peterson et al. |
| 2008/0024598 A1 | 1/2008 | Perlin et al. |
| 2008/0068329 A1 | 3/2008 | Shestak et al. |
| 2010/0182404 A1 | 7/2010 | Kuno |
| 2012/0092762 A1 | 4/2012 | Song et al. |

FOREIGN PATENT DOCUMENTS

JP 2000-098966 7/2000

OTHER PUBLICATIONS

Berthier, A. Images Stereoscopiques de Grand Format. Cosmos (34): 205-210 (1896) ; original and machine translation submitted herewith.
CIE. Commission internationale de l'Eclairage proceedings, 1931. Cambridge University Press, Cambridge. (1932).
Hecht, J. 3-D TV and Movies: Exploring the Hangover Effect. Optics & Photonics News. 20-27 (2011).
ITU-R BT.709-5: Parameter values for the HDTV standards for production and international programme exchange. Apr. 2002.
Ives, FE. A Novel Stereogram. Journal of The Franklin Institute. 153:51-52 (1902).
Wheatstone, C. Contributions to the Physiology of Vision. Part the First. On Some Remarkable, and Hitherto Unobserved, Phenomena of Binocular Vision. Phil. Trans. R. Soc. Lond. 128:371-394 (1838).
International Search Report and Written Opinion issued in PCT/US12/45618 dated Nov. 6, 2012.

*Primary Examiner* — Maurice L McDowell, Jr.
(74) *Attorney, Agent, or Firm* — McCarter & English, LLP

(57) ABSTRACT

Exemplary embodiments provide devices, systems and methods that enable viewing of three-dimensional images on an autostereoscopic display using a barrier grid of dynamically configurable grid characteristics. The barrier grid is configurable to include alternating light-transmitting and light-blocking portions that may be characterized by and configured using a set of one or more grid indicia. The cooperative display of an image on an image display device and the dynamically configurable barrier grid enables autostereoscopic 3D and 4D viewing of images.

20 Claims, 32 Drawing Sheets

FIG. 2

*Prior Art*

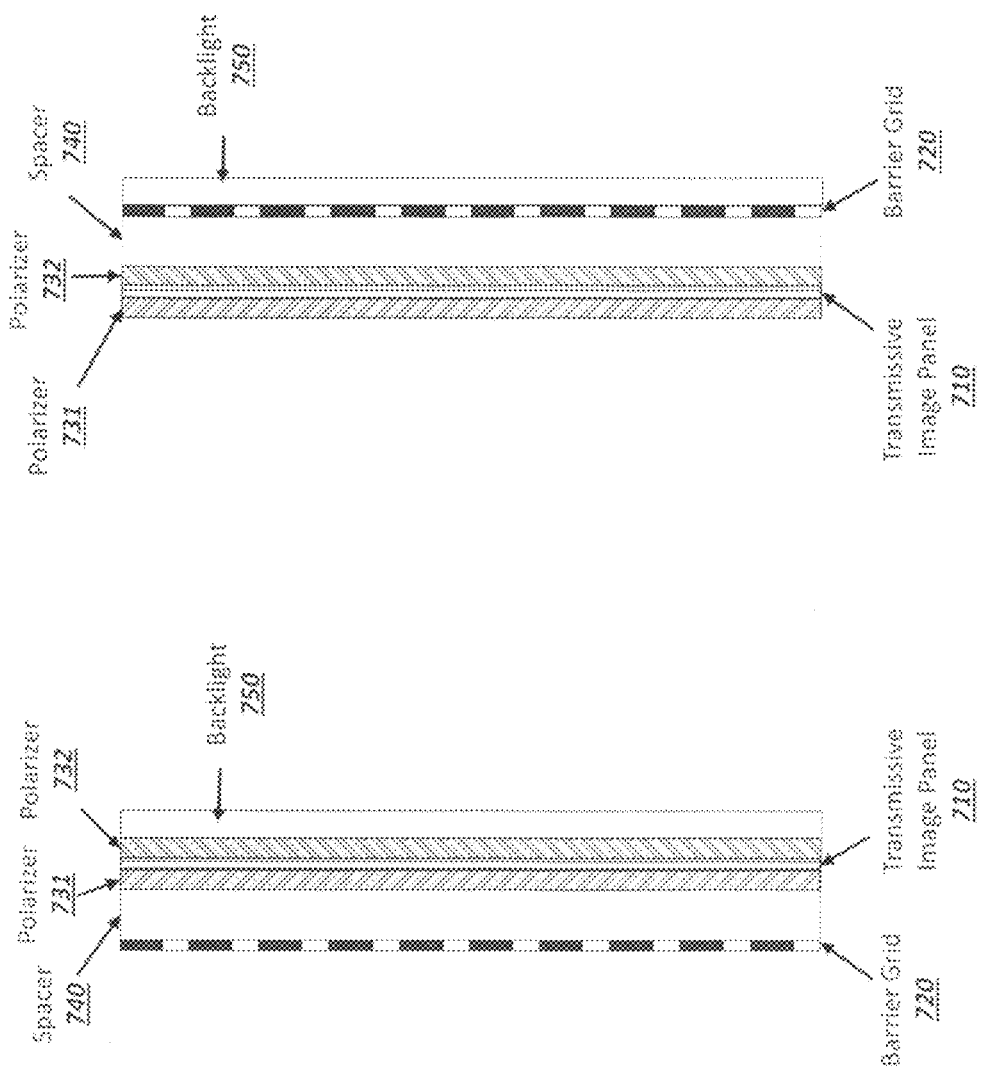

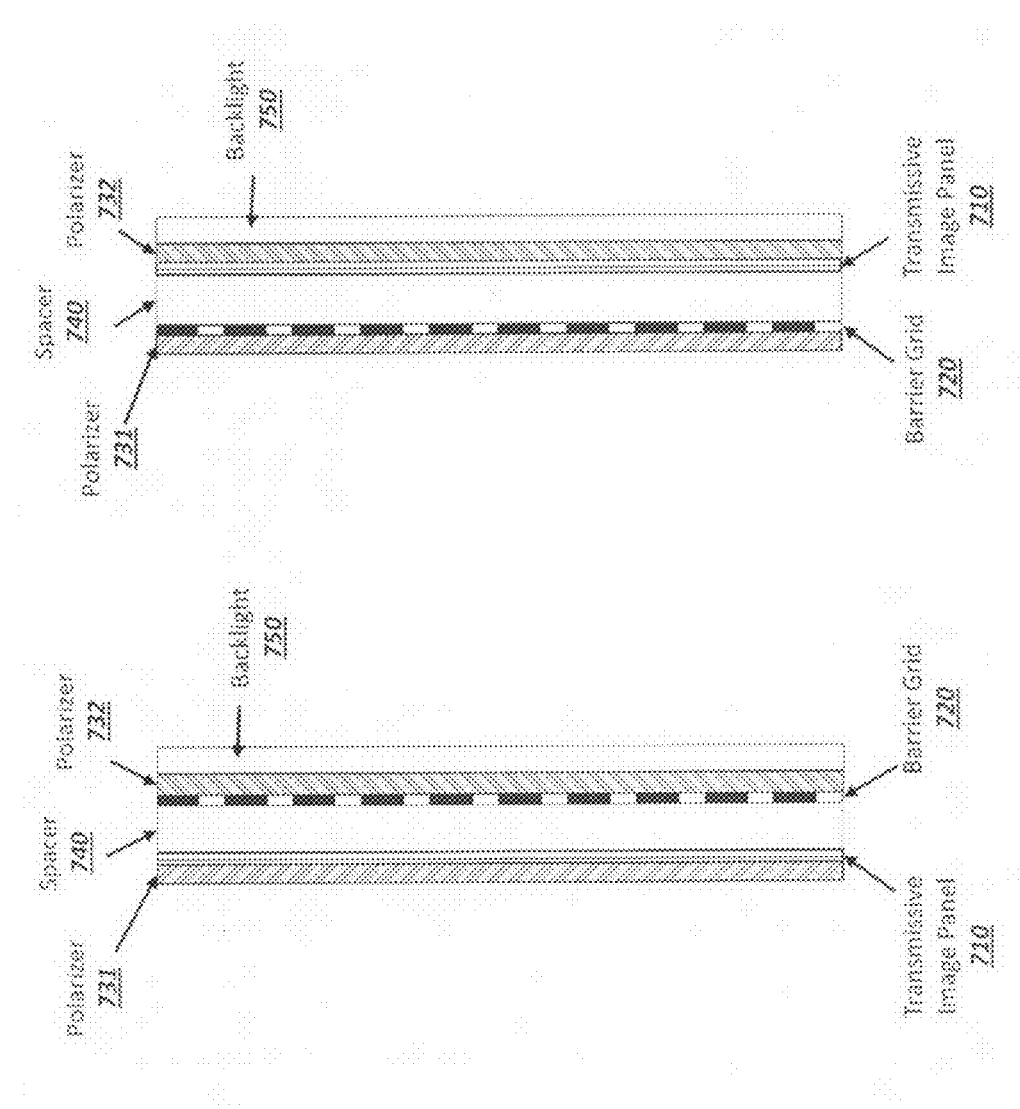

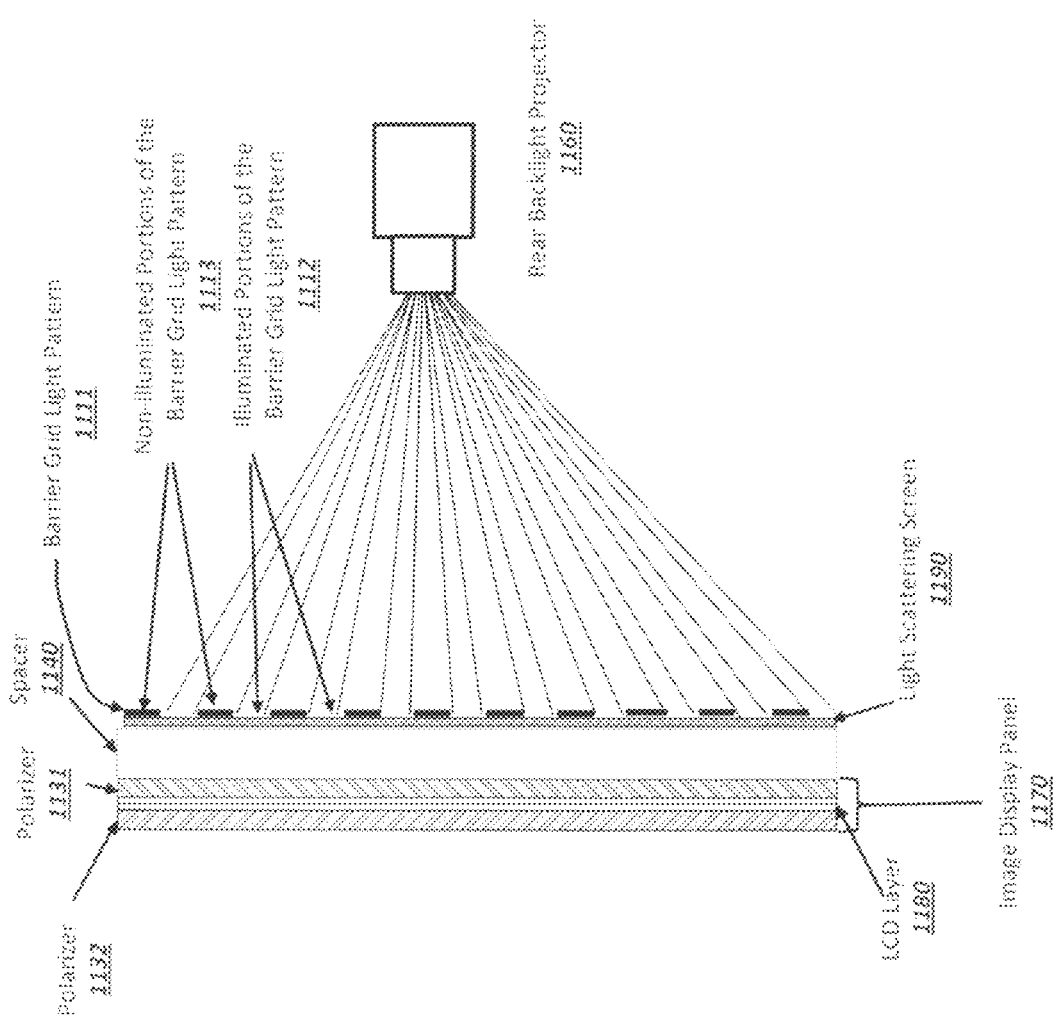

CALIBRATOR FOR AUTOSTEREOSCOPIC IMAGE DISPLAY

CROSS-REFERENCE TO RELATED APPLICATIONS

This application is a non-provisional of and claims priority to U.S. Provisional Application Ser. No. 61/571,811, filed Jul. 5, 2011; U.S. Provisional Application Ser. No. 61/571,812, filed Jul. 5, 2011; U.S. Provisional Application Ser. No. 61/571,813, filed Jul. 5, 2011; and U.S. Provisional Application Ser. No. 61/571,815, filed Jul. 5, 2011. The entire contents of each of the above-referenced applications are incorporated herein by reference in their entirety.

BACKGROUND

Stereopsis is the process in visual perception that allows perception of depth from two or more slightly different projections of a view onto the retinas of two eyes. Stereopsis was first described by Charles Wheatstone in 1838 ("Contributions to the Physiology of Vision. —Part the First. On some remarkable, and hitherto unobserved, Phenomena of Binocular Vision", Philosophical Transactions of the Royal Society of London, Vol. 128, pp. 371-394, 1838), which led to many attempts to achieve stereoscopic display by providing different images to the left and right eyes of a viewer using, for example, eye-glasses incorporating filters of a different color (e.g., red and cyan) or polarization for each eye.

Advances in computer graphics have created a recent resurgence in interest in multi-dimensional display for motion pictures and television. Multi-dimensional displays are typically referred to as 3D (three-dimensions, referring to the three spatial dimensions) or 4D (four-dimensions, referring to the three spatial dimensions and the added dimension of time).

There are two types of stereoscopic displays: those that require special eyeglasses and those that do not, the latter being referred to as autostereoscopic display systems. One conventional method of achieving autostereoscopy involves the use of lenticular lens arrays (see, for example, U.S. Pat. No. 1,128,979, "Stereoscopic Picture," W. Hess, Feb. 6, 1916). Another conventional approach is the use of barrier grids, also known as "parallax barriers", as described by Frederick E. Ives, "A novel stereogram," Journal of the Franklin Institute 153: 51-52, 1902). Some of commercial image display systems and image content that use conventional stereoscopic technologies exhibit deficiencies in at least one of viewer experience, system complexity, and system cost.

Visual deficiencies arise in conventional stereoscopic technologies, in part, because human perception of 3D does not depend on the parallax embodied in stereoscopy alone, but is also affected by the focal distance of the eye, obscuration of an object in the background by a nearer object, relative angular motion of objects at different distances, and motion as detected by the inner ear and saccadic motion. In fact, motion sickness and eyestrain are reported to result from viewing displays that are based on stereoscopy alone ("3D TV and Movies: Exploring the Hangover Effect", J. Hecht, Optics & Photonics News, February 2011, p, 20-27). That is, human depth perception is not solely based on binocular vision but rather is formed from multiple cues. These cues include, but are not limited to, relative object size, dynamically changing object size, motion parallax, apparent relative motion of different objects, accommodation by each eye, occlusion of one object by another, shadows, and the like. The cue inputs are integrated by a viewer's brain to generate the experience of depth perception.

SUMMARY

Exemplary embodiments provide devices, systems and methods that enable viewing of three-dimensional images on an autostereoscopic display using a barrier grid of dynamically configurable grid characteristics. The barrier grid is configurable to include alternating light-transmitting and light-blocking portions that may be characterized by and configured using a set of one or more grid indicia. The cooperative display of an image on an image display device and the dynamically configurable barrier grid enables autostereoscopic 3D and 4D viewing of images.

In accordance with one exemplary embodiment, a method is provided for calibrating a 3D composite image for display in an autostereoscopic image display system. The method includes displaying a barrier grid associated with an image display device in the autostereoscopic image display system, the barrier grid configurable to include a plurality of alternating vertical light-transmitting portions and light-blocking portions. The method includes displaying a calibration image on the image display device, variably resizing the calibration image on the image display device, and determining a brightness of the calibration image cooperatively displayed by the image display device and the barrier grid. The method also includes terminating the variable resizing of the calibration image when the brightness is exactly or approximately at or above a predefined minimum level, the predefined minimum level indicating calibration of the calibration image with the barrier grid. The method also includes storing resizing settings of the calibration image upon terminating the variable resizing.

In accordance with another exemplary embodiment, a system is provided for calibrating a 3D composite image for display in an autostereoscopic image display system. The system includes a dynamically configurable barrier grid configurable to include a plurality of alternating vertical light-transmitting portions and light-blocking portions. The system also includes an image display device. The system also includes a brightness detection device configured to determine a brightness of an image cooperatively displayed by the image display device and the barrier grid. The system also includes a calibration system configured to: display a calibration image on the image display device, variably resize the calibration image on the image display device, and terminate the variable resizing of the calibration image when a brightness of the calibration image, as detected at the brightness detection device, is exactly or approximately at or above a predefined minimum level, the predefined minimum level indicating calibration of the calibration image with the barrier grid.

In accordance with another exemplary embodiment, one or more non-transitory computer-readable media are provided. The one or more computer-readable media have encoded thereon one or more computer-executable instructions for a method for calibrating a 3D composite image for display in an autostereoscopic image display system. The method includes displaying a barrier grid associated with an image display device in the autostereoscopic image display system, the barrier grid configurable to include a plurality of alternating vertical light-transmitting portions and light-blocking portions. The method includes displaying a calibration image on the image display device, variably resizing the calibration image on the image display device, and determining a brightness of the calibration image cooperatively displayed by the image display device and the barrier grid. The method also includes terminating the variable resizing of the calibration image when the brightness is exactly or approximately at or above a predefined minimum level, the predefined minimum level indicating calibration of the calibration image with the barrier grid. The method also includes storing resizing settings of the calibration image upon termination of the variable resizing.

In accordance with another exemplary embodiment, a method is provided for calibrating a dynamically configurable barrier grid for display in an autostereoscopic image display system. The method includes displaying a dynamically configurable barrier grid associated with an image display device in the autostereoscopic image display system, the barrier grid configurable to include a plurality of alternating vertical light-transmitting portions and light-blocking portions. The method includes displaying a calibration image on the image display device, variably resizing the barrier grid, and determining a brightness of the calibration image cooperatively displayed by the image display device and the barrier grid. The method also includes terminating the variable resizing of the barrier grid when the detected brightness is exactly or approximately at or above a predefined minimum level, the predefined minimum level indicating calibration of the barrier grid with the calibration image. The method also includes storing resizing settings of the barrier grid upon terminating the variable resizing.

BRIEF DESCRIPTION OF THE DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 illustrates exemplary rows and columns of a Bayer mask display matrix.

FIG. 7a is a schematic diagram of an exemplary configuration of a dynamically configurable barrier grid and an image display panel.

FIG. 7b is a schematic diagram of another exemplary configuration of a dynamically configurable barrier grid and an image display panel.

FIG. 7c is a schematic diagram of another exemplary configuration of a dynamically configurable barrier grid and an image display panel.

FIG. 7d is a schematic diagram of another exemplary configuration of a dynamically configurable barrier grid and an image display panel.

FIG. 11b is a schematic diagram of another exemplary configuration in which a dynamic barrier grid is formed by a backlight pattern projected onto the rear side of an LCD image display panel by a rear projector.

DETAILED DESCRIPTION

Before the present devices, systems and methods are described, it is to be understood that this invention is not limited to the particular processes, devices, or methodologies described, as these may vary. It is also to be understood that the terminology used in the description is for the purpose of describing the particular versions or embodiments only and is not intended to limit the scope of the present disclosure which will be limited only by the appended claims.

Certain terms are defined in this section to facilitate understanding of exemplary embodiments.

The terms "3D," "3-D" and "three-dimensional," as used herein, refer to the three spatial dimensions (length, width and height).

The terms "4D," "4-D" and "four-dimensional," as used herein, refer to the three spatial dimensions (length, width and height) and the added dimension of time.

The term "dynamically configurable," as used herein in the context of an exemplary barrier grid, refers to a barrier grid in which one or more grid characteristics are configurable upon setup of the grid and/or after setup and during use of the grid. Exemplary grid characteristics that may be dynamically configurable include, but are not limited to, the width of the light-blocking portions, the width of the light-transmitting portions, the repeat dimension, the ratio of the width of the light-blocking portions to the width of the light-transmitting portions, the total width of the barrier grid, the total height of the barrier grid, and the like.

The term "composite image" of an object, as used herein, refers to a image in which portions of two or more images of the object taken by at different angles are coded to form one interlaced image, such that display of the composite image in an autostereoscopic display device enables 3D autostereoscopic viewing of the object.

The term "disparity," as used herein, refers to the difference in image location of an object between the images seen by the left and right eyes, that may be used to determine depth information.

Figure 1:
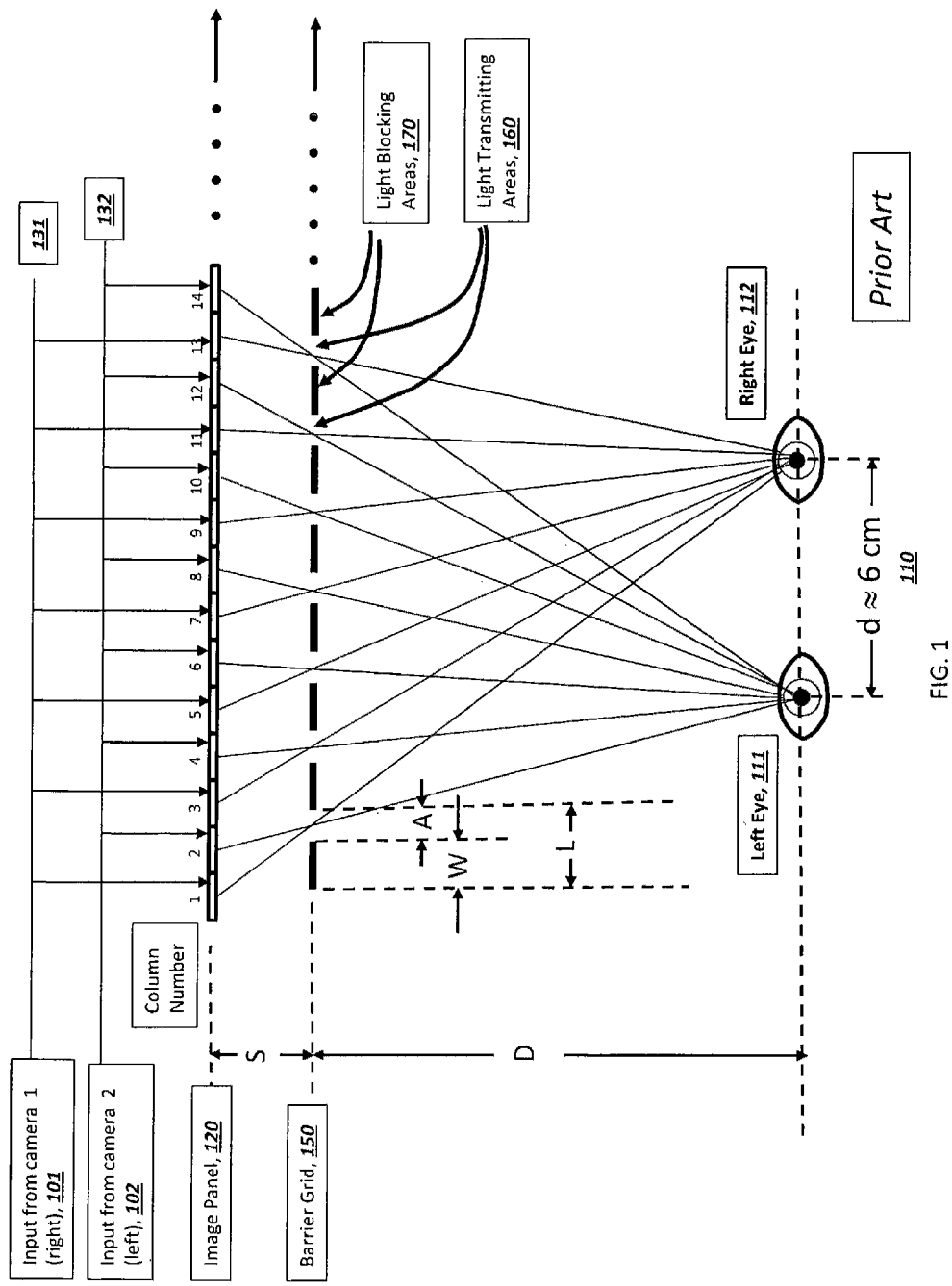
FIG. 1 is a schematic diagram of a conventional autostereoscopic display including a static and unconfigurable barrier grid and an image display panel.

FIG. 1 illustrates an image display system to display the principle of operation underlying conventional static and unconfigurable barrier grids. The image display system includes an image display panel 120 for displaying an image. Exemplary image display panels 120 may include, but are not limited to, liquid crystal display (LCD), light-emitting diode (LED), organic light-emitting diode (OLED), plasma devices, and the like. Images are acquired by two cameras separated by approximately the inter-ocular distance 110 between a viewer's eyes, 111 and 112. The inter-ocular distance varies among individuals, with a typical value for adult males being about 6 cm. The images are inputted separately to the image display panel 120 as input signals 101 and 102. The images are provided to adjacent columns of the image display panel 120, with the first camera feeding data to odd numbered columns, 131, and the second camera feeding data to even numbered columns, 132. The horizontal positions of the display columns are determined by the size and resolution of the image display panel 120. For example, a high-definition (HD) 1080p (having 1920 columns) LCD display with a 48" horizontal dimension typically has 20 Bayer mask columns/inch, with each Bayer mask color pixel, 210, comprised of a red-green (RG) pair, 211, and a green-blue (GB) pair, 212, arranged as a 2×2 pattern, as exemplified by FIG. 2.

The image display system also includes a static and unconfigurable barrier grid 150 disposed between the image display panel 120 and the eyes of a viewer 111, 112. As can be seen in FIG. 1, the dimensions of the barrier grid are selected and fixed to allow only the odd-numbered columns to be seen by one of the viewer's eyes and even-numbered columns to be seen by the other, giving rise to a stereoscopic effect. The barrier grid 150 may be spaced from the image display panel 120 by a distance denoted as S, and from the viewer's eyes 111, 112 by a distance denoted as D. Exemplary values for distance S may range from about 3 mm to about 15 mm, but are not limited to this exemplary range. Exemplary values for distance D may range from about 3 feet to about 18 feet, but are not limited to this exemplary range. The barrier grid 150 may include a plurality of vertical alternative light-transmitting portions 160 and light-blocking portions 170. Each segment of a light-transmitting portion and an adjacent light-blocking portion has a width denoted as L (also known as the repeat dimension). Exemplary repeat dimensions L may range from about 10 lines/inch to about 40 lines/inch, but are not limited to this exemplary range. Each light-blocking portion has a width denoted as W, and each light-transmitting portion has a width denoted as A (also known as the aperture). Exemplary width A may range from about 10% to about 50% of the repeat distance L, but is not limited to this exemplary range. For an exemplary 40-inch image display panel having 1920 columns, exemplary values of L may range from about 5 mm to about 125 mm, but are not limited to this exemplary range; exemplary values of A may range from about 2.5 mm to about 12.5 mm, but are not limited to this exemplary range;

and exemplary values of W may range from about 2.5 mm to about 112.5 mm, but are not limited to this exemplary range.

The conventional barrier grid 150 of FIG. 1 is static and unconfigurable in that the parameters A, W, and L are fixed throughout the lifetime of the barrier grid 150 and do not vary as a function of time and/or in response to external inputs. That is, the light-transmitting portions 160 and the light-blocking portions 170 have static and unchanging widths and positions across the entire width of the conventional barrier grid 150. In contrast, an exemplary barrier grid provided in accordance with the teachings provided herein is dynamically configurable in that one or more of the parameters A, W, and L (known as grid indicia) may be set, reset, changed and/or configured. One or more of the parameters may be set and/or changed by selection during initial setup of the autostereoscopic display system. One or more of the parameters may be set and/or changed by selected after initial setup as a function of time and/or in response to external input, for example, from a user.

Dynamic barrier grids, provided in accordance with the teachings herein, allow for adjustment of the barrier grid to the associated image display panel on which encoded 3D columns are provided. Dynamic barrier grids enable adjustment to content generated by different numbers of image acquisition devices (e.g., cameras) or rendered from different points of view using computational techniques. Dynamic barrier grids also enable adjustment to improve the displayed image based on the distance of the image acquisition devices to an object in a scene being imaged. Furthermore, a dynamic barrier grid facilitates matching the image and size of the barrier grid to the columns on the image display panel. In addition, the dynamic barrier grid may be used to block off end regions where there is incomplete overlap of component images.

Figure 2:
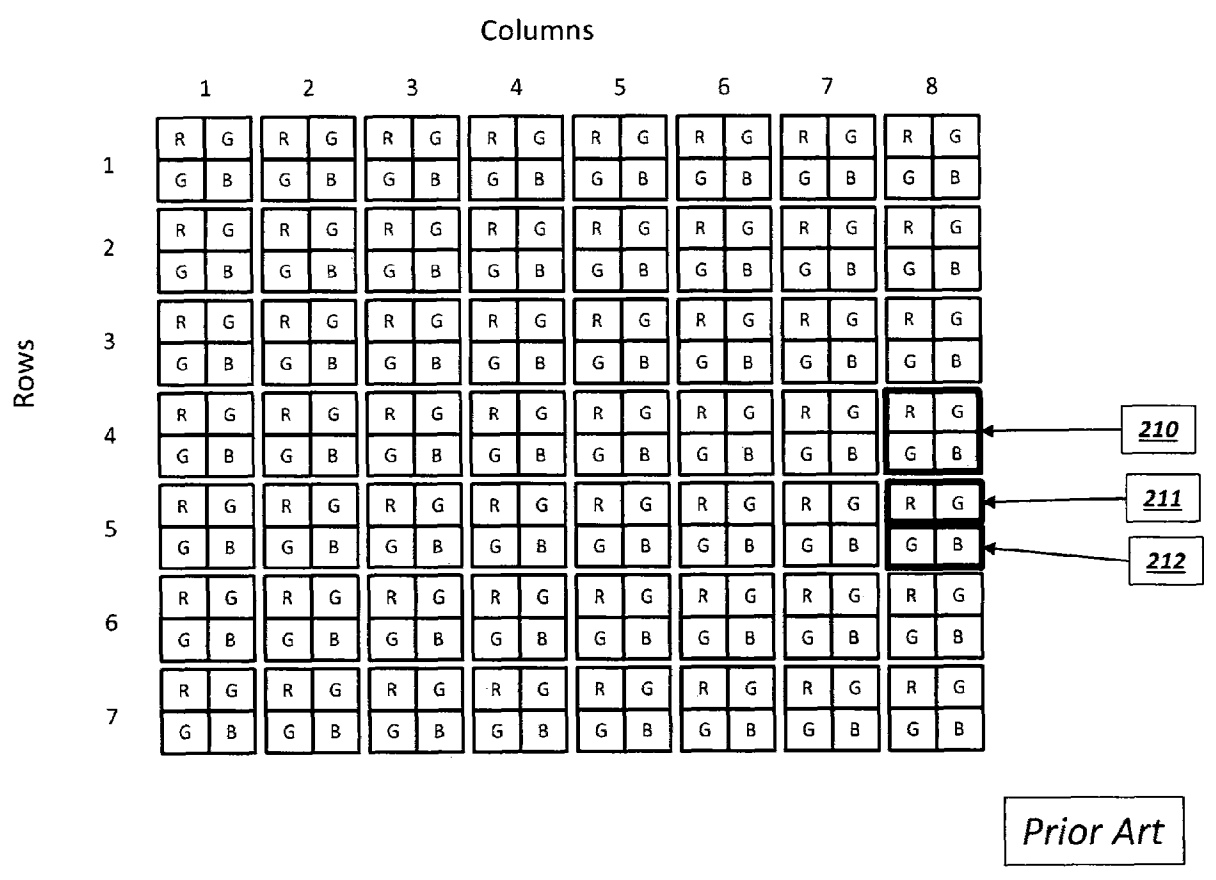

FIG. 2 illustrates exemplary rows and columns of a Bayer mask displace matrix. In this case, each of the RGGB sub-pixels is shown to be square as are the 2×2 composite pixels. The separation distances between the composite pixels in the figure are shown only for clarity. In other exemplary embodiments, the pixels may have different geometries than those shown in FIG. 2 and/or may not be separated. In the example illustrated in FIG. 2, a high-definition (HD) 1080p (having 1920 columns) LCD display with a 48" horizontal dimension has 20 Bayer mask columns/inch, with each Bayer mask color pixel, 210, comprised of a red-green (RG) pair, 211, and a green-blue (GB) pair, 212, arranged as a 2×2 pattern.

An exemplary autostereoscopic system may receive and display composite images generated from any suitable number of images including, but not limited to, 2, 3, 4, 5, 6, 7, 8, 9, 10, 11, 12, 13, 14, 15, 16, 17, 18, 19, 20, and more. In an exemplary embodiment, a plurality of images may be taken with a plurality of image acquisition devices not limited to two image acquisition devices. A plurality of image acquisition devices (e.g., cameras) may be used to capture images from multiple viewing angles, enabling the display of stereoscopic images in a similarly broad angular range to viewers of the display.

Figure 3A:
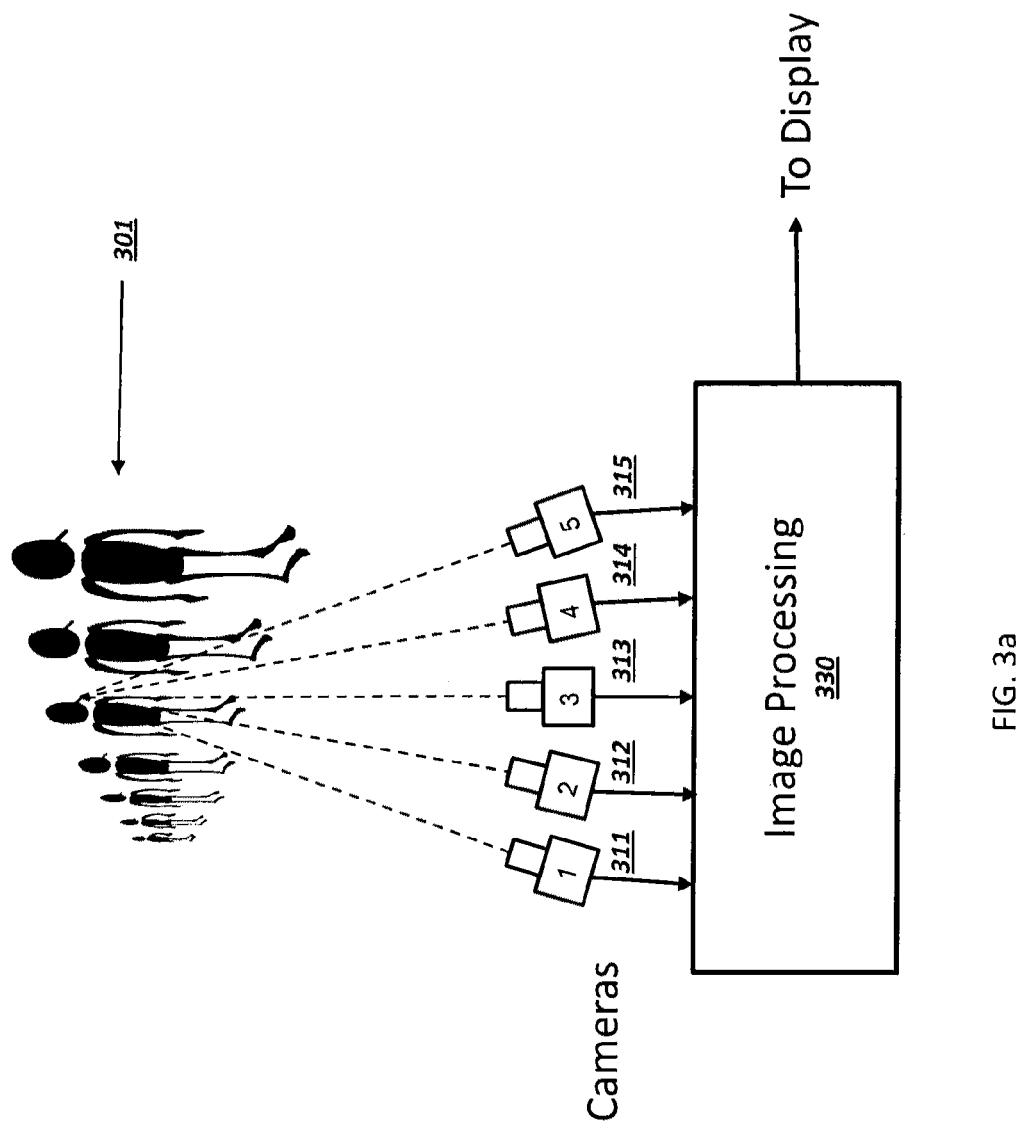
FIG. 3a illustrates an exemplary multi-camera stereoscopic image acquisition system, with the camera mechanically aligned to point to the planar point.

FIG. 3a shows an exemplary image acquisition system including five image acquisition devices, 311, 312, 313, 314, 315 (e.g., cameras). In a preferred embodiment, the number of image acquisition devices may be about 20, depending upon the specifics of the type of image displayed, the size of the display, and the desired distribution of viewing angles.

The image acquisition devices of FIG. 3a may be used to capture images of any suitable objects. In the example illustrated in FIG. 3a, seven figures of subject image being captured, 301, depict seven persons located at different distances from the image acquisition devices, i.e., at different depths. In an exemplary embodiment, the image acquisition devices may be mechanically oriented to the same point in three-dimensional space, a point in a plane that constitutes the planar position of the image. The planar position is defined as the position where the depth plane will be displayed at the surface of the display and will not be perceived as being in front of or behind the screen surface. The planar point could, for example, be the nose of the third figure from the right in 301.

Orienting the cameras to the planar point is particularly appropriate if the distance between the subject and cameras is relatively small (closer than 4 feet) to avoid excessive visual binocular disparity of the images acquired by the cameras. Only the portions of the captured images that are common to all the captured images may be used in some exemplary embodiments. The portions of the captured images that are not common to all captured images may not be used in these exemplary embodiments. The unused portions of the images are referred to as cropped portions of the images. Cropping of the images becomes larger for cameras positioned farther from the center-line of the camera system for configurations in which cameras are oriented parallel to one another.

The image output by each image acquisition device may be provided as input to a computing and/or processing device 330 that processes the captured images to generate column image data to be provided for display using the pixels of an image display panel. In an exemplary embodiment, the computing device 330 may interlace the plurality of captured images to generate a composite 3D encoded image that may be displayed in an exemplary autostereoscopic viewing system. The computing device 330 may be provided separately from the image capture devices 311, 312, 313, 314, 315, or may be provided at one or more of the image capture devices.

The exemplary embodiment illustrated in FIG. 3a may be used when the distance between the subject and cameras is in an intermediate range (for example, about four feet to about seven feet). In this case, a first group of cameras, positioned towards the centerline of the system, may be oriented parallel to one another because the cropping of the acquired images is not large and the disparity is not excessive. Each camera of a second group of cameras, comprising those located farther (for example, about seven feet to about twelve feet) from the centerline on either side of the camera system, is oriented toward the planar point to avoid large amounts of cropping and excessive disparity.

Figure 3B:
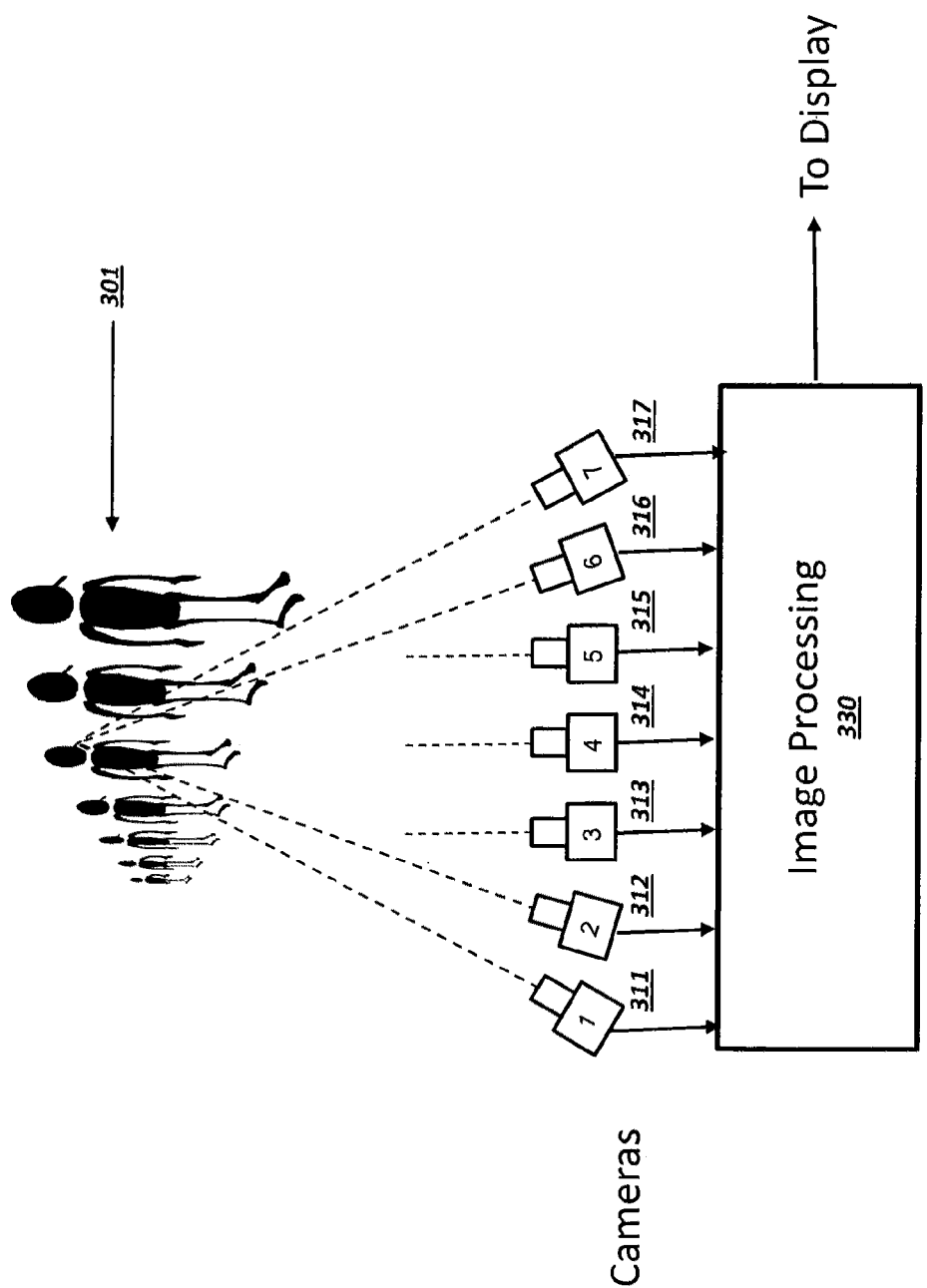
FIG. 3b illustrates an exemplary multi-camera stereoscopic image acquisition system, with a first group of camera mechanically aligned to point to the planar point and a second group of cameras aligned parallel to one another.

FIG. 3b shows seven cameras, 311, 312, 313, 314, 315, 316, and 317 arranged in a flattened arc configuration, in which the cameras positioned toward the middle, 313, 314, and 315 are illustrative examples of the first group of cameras and the cameras positioned towards the ends, 311, 312, 316, and 317, are illustrative examples of the second group of cameras.

Figure 4:
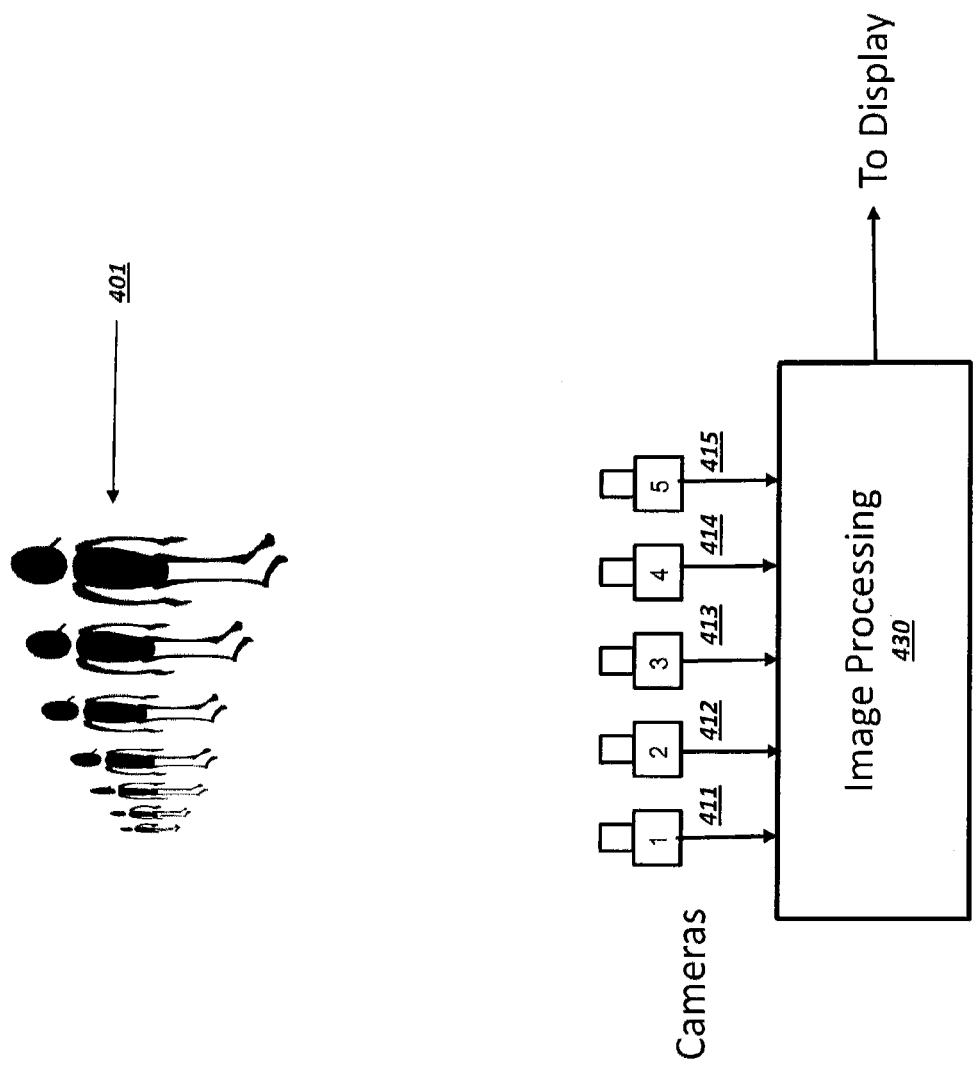
FIG. 4 illustrates an exemplary multi-camera stereoscopic image acquisition system, with cameras aligned parallel to one another.

In an exemplary embodiment illustrated in FIG. 4, suitable for longer subject-camera distances, image acquisition devices (e.g., cameras) of an image acquisition system may be oriented parallel to one another and may be separated by the same distance from one another. The image output by each image acquisition device may be provided as input to a computing and/or processing device 430 that processes the captured images to generate column image data to be provided to an image display panel. In an exemplary embodiment, each of the image acquisition devices, 411, 412, 413, 414, and 415, captures an image that may be electronically processed such that the same point in physical space represents the planar point of the subject image, 401. One advantage of the parallel configuration of the image acquisition devices is there is no preferred distance from the subject, 401, as opposed to the mechanically aligned arrangement of FIG. 3 in which the subject, 301, is preferentially located at the intersection of the optical axes of the image acquisition devices. Another advantage of the parallel configuration of FIG. 4 is the ease of mechanical alignment of the image acquisition devices. The exemplary device of FIG. 4 may be configured and used for relatively long subject-camera distances, for example, greater than about twelve feet.

Figure 5A:
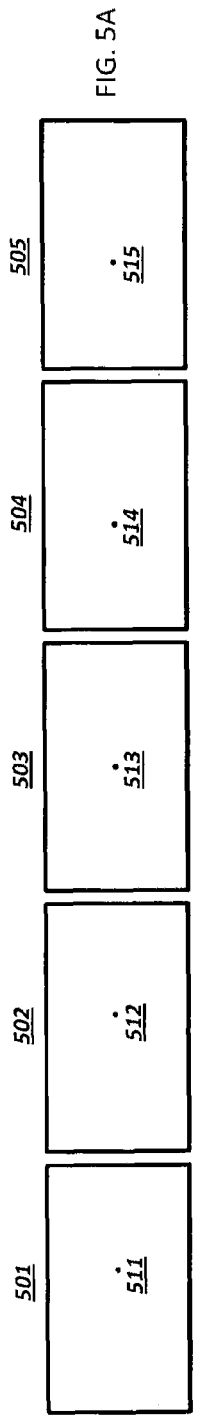
FIGS. 5A-5D illustrate an example of combining acquired image frames from five cameras aligned in parallel, with generation of a single composite image having superimposed planar points, with side data removed and the composite image resized.
Figure 5B:
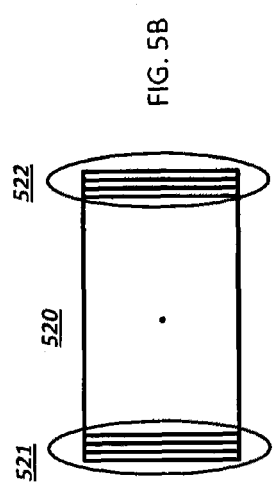
Figure 5C:
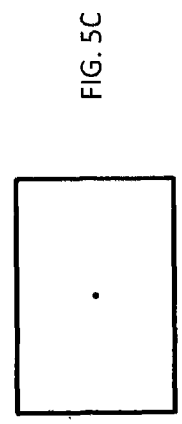
Figure 5D:
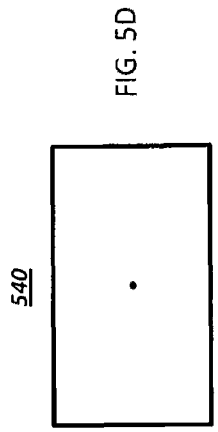

The images acquired by image acquisition devices 411, 412, 413, 414, and 415 aligned in parallel are shown schematically in FIG. 5a as images 501, 502, 503, 504, and 505, respectively. The images 501, 502, 503, 504, and 505 are at least partially overlapping. The dot in each image 511, 512, 513, 514, and 515 represents the planar point or centroid of the respective acquired image. The acquired images may have any suitable row and column count, for example, 1080 rows and 1920 columns. Each image acquisition device in this example may acquire a 1080×1920 image. The column data of the five images may be electronically combined, as described below, to form a composite image, 520, as shown in FIG. 5b, such that the planar points of each image are superimposed. In an exemplary embodiment, the side portions of the composite image (i.e., portions that are not overlapping among all the images), shown by the regions within 521 and 522 in FIG. 5b, may be removed, leaving the central portion of the composite image, 530. The central portion of the composite image 530 excluding the side portions 521, 522 is shown in FIG. 5c. In an exemplary embodiment, the resulting composite image may be resized to provide a desired input to an image display panel, e.g., an image having 1920 columns, as shown as 540 in FIG. 5d.

Figure 6:
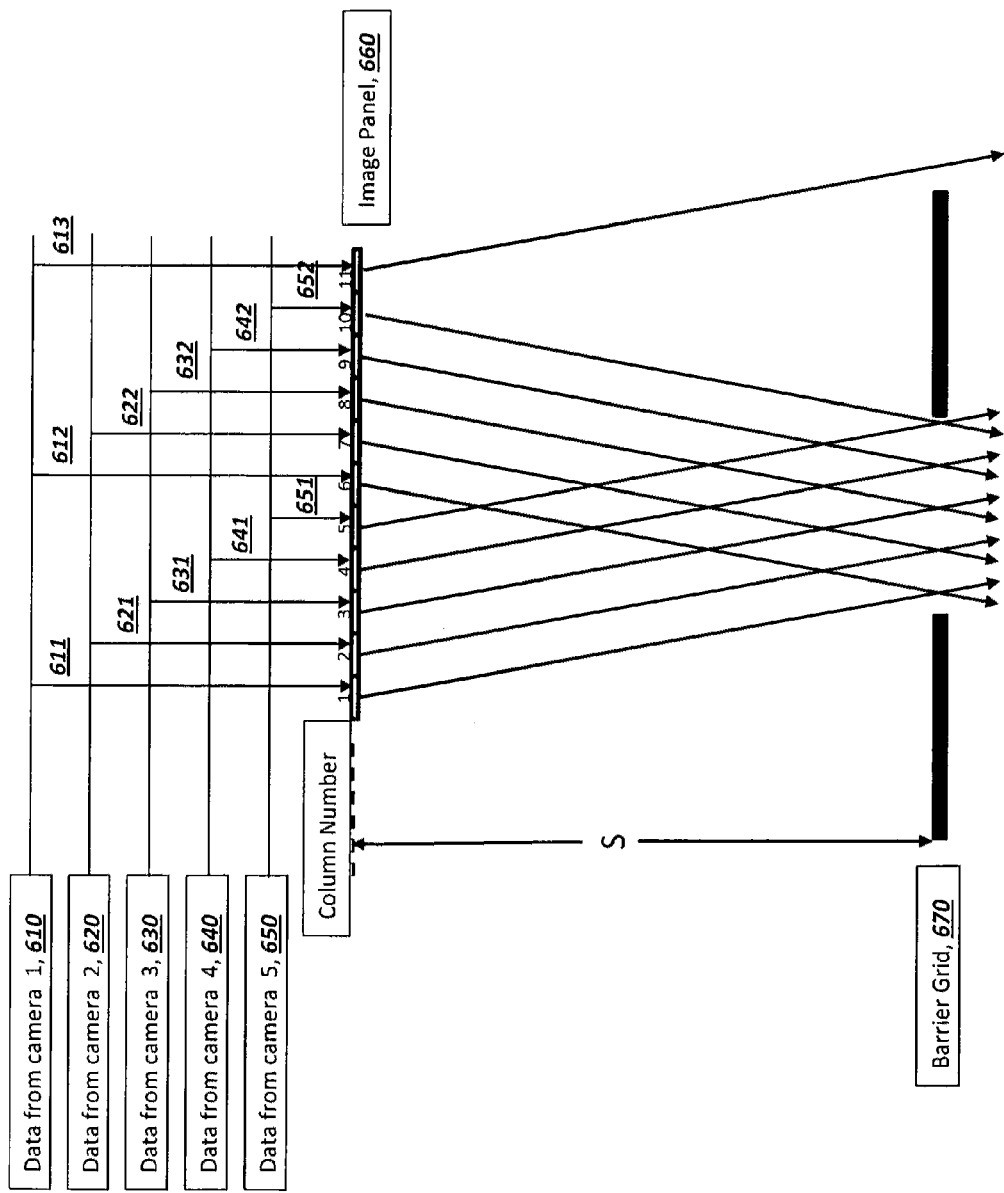
FIG. 6 illustrates a multi-camera acquisition system providing data to the columns of an image display panel with an exemplary dynamically configurable barrier grid spaced from the image display panel to enable autostereoscopic 3D viewing of the image.

Image data from an image acquisition system comprised of m image acquisition devices (e.g., cameras) is fed into sequentially adjacent columns of the image display panel with a barrier grid positioned to provide stereoscopic separation of the viewed image. As shown in FIG. 6 for a five-camera acquisition system, data from each of the cameras, 610, 620, 630, 640, and 650 are generated and provided to respective columns of the image display panel 660. The image display panel 660 is provided cooperatively with and spaced from a dynamically configurable barrier grid 670.

In general, image data acquired by a total number of image acquisition devices (M) may be fed into sequentially adjacent columns of an image display panel having a total number of columns (N), For image data acquired by each image acquisition device (m), the image data may be fed into a total number of columns of the image display panel denoted by the integer value of N/M. For example, in the 5-camera system and an image display panel comprising the 11 columns depicted in FIG. 6, data from each camera may be fed into two or three columns in the image display panel. As one example, the first column 611 of image data acquired by camera 1, may be processed and provided to the first column of the image display panel 660. Similarly, the sixth, 612, and eleventh, 613, columns of the image data acquired by camera 1 may be processed and provided to respective sixth and eleventh columns of the image display panel. Thus, in an example of a display panel having N=1920 columns and an image acquisition system comprising M=5 cameras, the integer value of N/M=384. In another example, with N=1920 and M=7 cameras, the integer value of N/M=274.

In a preferred embodiment, the number of columns of the image display panel is the same as the number of columns provided by each of the identical image acquisition devices.

As one example, the display panel and the image acquisition devices may both have a format comprising 1920 columns by 1080 rows.

The columns of data acquired by each image acquisition device, m, may be identified by a camera column index k, where $1 \leq k \leq N$. Each column of the image display panel may be identified by a column index n, where $1 \leq n \leq N$.

The image data provided to the $n^{th}$ column of the image display provided by the $k^{th}$ column of image data from camera m may be described by the condition: n=k if (k−m)=0 (mod M).

Exemplary embodiments may occlude a first set of columns of the image data and leave a second set of columns of the image data un-occluded. Only those columns of data from camera m where k−m=0 (mod M) are left un-occluded and allowed to be transmitted to the display. Columns of data where the relationship does not apply are blocked or occluded and prevented from being transmitted to the display. Thus, in an exemplary 5-camera system (M=5), the data from the $483^{rd}$ column (k) of the $3^{rd}$ camera (m) satisfies the condition, 483−3=480=96.5=0 (mod 5) and, therefore, is left un-occluded and transmitted to the $483^{rd}$ column (n) of the display. The column data in k=484 of m=4 is likewise left un-occluded and transmitted to the display. The data in k=484 of camera 3, however, does not satisfy the condition: k−m=484−3=481=96.5=1 (mod 5), and is, therefore, occluded and prevented from being transmitted to the display.

As additional examples, referring to FIG. 6, the first, sixth and eleventh columns of image data acquired by the first camera 1 may be fed into corresponding first, sixth and eleventh columns of the image display panel. In this manner, all columns of the image display panel are provided with image data from one of the image acquisition devices comprising the image acquisition system.

In the example depicted in FIG. 6, the total number of image acquisition devices (M) is 5, the total number of columns of the image display panel (N) is 11, and integer i ranges from 1 to 2. As such, the sequence of acquired data columns from the first camera (m=1) fed into and used by corresponding columns of the image display panel is 1, 6.

In another example, an image display panel may include 1920 columns and a 5-camera image acquisition system may have cameras that all have 1920 columns of pixels. In this example, image data from the $1004^{th}$ column of the $4^{th}$ camera is displayed in the $1004^{th}$ column of the image display panel.

In other embodiments, the number of columns provided by each of the identical M cameras may differ from the number of columns, N, available on the image display panel. For example, the cameras may each provide image data in 960×540 format while the display panel has a native resolution of 1920×1080. In such cases, the M camera images may be interlaced at the resolution of the camera, i.e., 960 columns in this example. The resolution of the interlaced image is changed to match that of the display panel. In a preferred embodiment, a bicubic interpolation is used to change the resolution to determine the value and position of an interpolated pixel. The interpolated image is then scaled to match the size of the display panel.

The use of a matte to occlude (and prevent from transmission to an image display panel) a first set of columns of image data and to occlude (and allow transmission to an image display panel) a second set of columns of image data significantly reduces the processing required as compared to alternative methods in which additional columns of data from the cameras are used to convert a plurality of 2D images into a composite 3D image. Use of a mask as described above allows real-time capture and processing of live images by cameras with latency times ≦15 ms.

Image processing and/or interlacing of multiple acquired images may be performed by computing and/or processing modules 330 and 430 of FIG. 3 and FIG. 4, respectively. Certain exemplary image processing and/or interlacing devices or modules may be implemented by the devices illustrated in FIGS. 25 and 26. These computing and/or processing devices may or may not be provided in a networked environment.

Figure 7E:
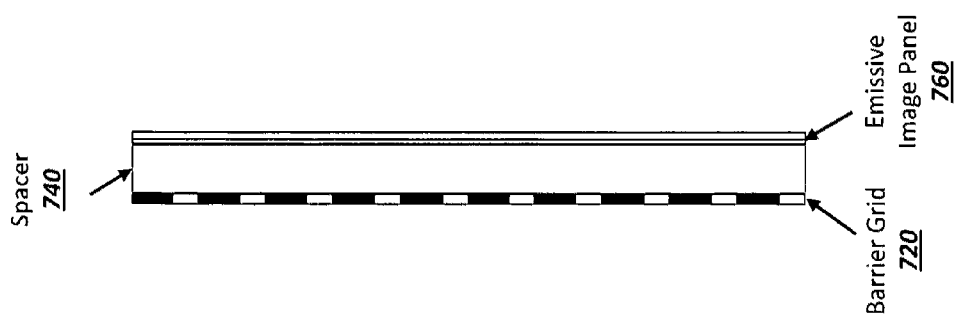
FIG. 7e is a schematic diagram of another exemplary configuration of a dynamically configurable barrier grid and an image display panel.

In an exemplary autostereoscopic image viewing system, the barrier grid can be positioned on either side of the image display panel with respect to the backlight, as shown in FIG. 7. In all five FIGS. 7a, 7b, 7c, 7d, and 7e, the viewer is located on the left of the display assembly. Four embodiments shown in FIGS. 7a, 7b, 7c, and 7d comprise a transmissive flat image display panel 710, e.g., an LCD display, with a barrier grid 720. In each embodiment, the LCD display panel 710 is located between front and rear polarizers, 731 and 732. The barrier grid 720 is spaced apart from the transmissive flat-panel display 710 by a spacer 740. A backlight 750 illuminates the assembly from the rear in each of the cases shown. FIG. 7a shows the barrier grid external to a commercially available LCD display panel 710, enabling such displays, e.g., standard HDTVs, to be incorporated into the autostereoscopic display without modification of the display itself. FIG. 7b shows an embodiment in which the barrier grid 720 is interposed between the backlight 750 and the rear polarizer 732 of a transmissive image display panel 710. In FIG. 7c and FIG. 7d, the autostereoscopic display is manufactured with the barrier grid internal to the LCD polarizers. FIG. 7e shows an embodiment comprising an emissive image display panel, 760, associated with and separated from a barrier grid 720 by a spacer 740. Examples of emissive display panels include, but are not limited to, plasma displays, field-emission displays (FEDs), cathode ray tubes (CRTs), and electroluminescent (EL) panels, as well as displays incorporating light-emitting diodes (LEDs), organic light-emitting diodes (OLEDs), and the like.

The grid characteristics of an exemplary dynamically configurable barrier grid may be tuned or configured to reduce or eliminate color-fringing arising from optical interference. The thickness of the spacer positioned between the image display panel and the barrier grid determines the distance range for viewing of a 3D image. In an exemplary embodiment, an optical diffusion layer may be incorporated on the image display panel and/or the barrier grid to reduce color-fringing artifacts caused by interference between the pixel structure of the image display panel and the barrier grid. In an exemplary embodiment, providing a barrier grid with a lower-than-expected spatial frequency (i.e., lower than expected repeat dimension L) also reduces color-fringing artifacts caused by interference between the pixel structure of the image display panel and the barrier grid. In one embodiment, when displaying images on a 55" screen (measured diagonally), use of a barrier grid having a repeat dimension L of about 12 lines/inch advantageously eliminated all color-fringing.

Figure 8A:
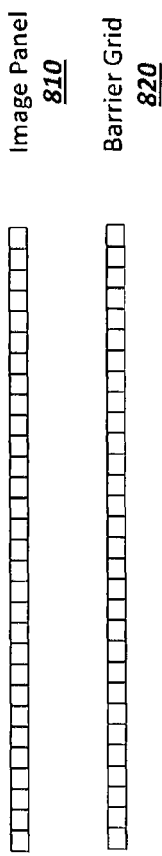
FIG. 8a is a schematic diagram of an image display panel and an exemplary dynamically configurable barrier grid that is turned off (i.e., is transparent).

In an exemplary embodiment illustrated in FIG. 8a, image data is provided to a first image display LCD panel 810 while a dynamically configurable barrier grid is formed on a second LCD panel 820. Cooperative display of the image data on the image display panel 810 and the barrier grid on the second panel 820 enables autostereoscopic viewing of 3D and/or 4D images. FIG. 8a shows the dynamically configurable barrier grid turned off or in a deactivated state, in which the entire second LCD panel 820 is transparent and devoid of alternative light-blocking portions. Configuration of the dynamically configurable barrier grid to be in the deactivated state on the second LCD panel 820 enables 2D viewing of images on the image display panel 810.

When the dynamically configurable barrier grid is turned on or activated, one or more grid characteristics may be set or configured including, but not limited to, the width of the light-blocking portions, the width of the light-transmitting portions, the repeat dimension L, the ratio of the width of the light-blocking portions to the width of the light-transmitting portions, the total width of the barrier grid, the total height of the barrier grid, and the like. Upon activation of the barrier grid, one or more grid characteristics may be re-set or changed including, but not limited to, the width of the light-blocking portions, the width of the light-transmitting portions, the repeat dimension L, the ratio of the width of the light-blocking portions to the width of the light-transmitting portions, the total width of the barrier grid, the total height of the barrier grid, and the like. The grid characteristics may be specified in one or more grid indicia received from a user, a processing device or module internal to the autostereoscopic display system, external to the autostereoscopic display system, and the like. Upon receiving the grid indicia, the second LCD panel 820 may be configured either be completely transparent (i.e., not display a barrier grid or display a deactivated barrier grid) or to display alternating vertical light-blocking and light-transmitting portions (i.e., display a barrier grid) according to the specifications of the grid indicia.

Figure 8B:
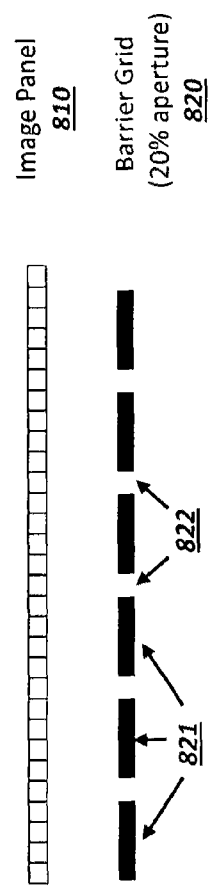
FIG. 8b is a schematic diagram of the image display panel and the barrier grid of FIG. 8a in which the barrier grid is turned on to have an exemplary 20% aperture approximately (i.e., in which the ratio between the light-blocking portions and the light-transmitting portions is about 4:1).
Figure 8C:
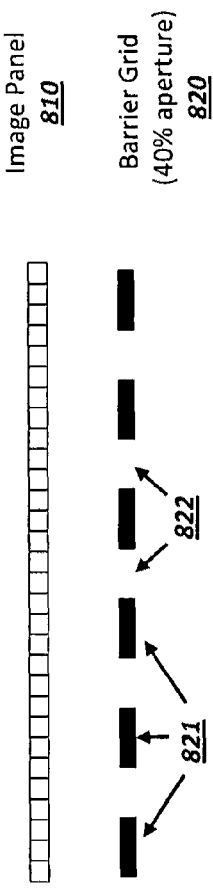
FIG. 8c is a schematic diagram of the image display panel and the barrier grid of FIG. 8a in which the barrier grid is turned on to have an exemplary 40% aperture approximately (i.e., in which the ratio between the light-blocking portions and the light-transmitting portions is about 3:2).

In an exemplary embodiment, the width of the light-blocking portions may be configured to be greater than the width of the light-transmitting portions. In some exemplary embodiments, the width of the light-blocking portions may be configured to be about two to five times greater than the width of the light-transmitting portions. FIG. 8b shows an exemplary first barrier grid turned on with a 20% clear aperture, i.e., with a width ratio between the light-blocking portions 821 to the light-transmitting portions 822 of about 4:1. FIG. 8c shows an exemplary second barrier grid turned on with a 40% clear aperture, i.e., with a width ratio between the light-blocking portions 821 to the light-transmitting portions 822 of about 3:2. In exemplary embodiments, the first barrier grid shown in FIG. 8b may be configured (i.e., the widths of the light-transmitting and/or light-blocking portions of the first barrier grid may be changed) to generate the second barrier grid shown in FIG. 8c. Similarly, the second barrier grid shown in FIG. 8c may be configured (i.e., the widths of the light-transmitting and/or light-blocking portions of the first barrier grid may be changed) to generate the first barrier grid shown in FIG. 8b. One of ordinary skill in the art will recognize that width ratios between the light-blocking portions 821 to the light-transmitting portions 822 are not limited to the illustrative width ratios shown in FIGS. 8b and 8c, and that exemplary barrier grids may be configured using any suitable width ratio.

The grid characteristics of an exemplary dynamically configurable barrier grid may be tuned or configured to improve depth perception. In some exemplary embodiments, as the width of the light-blocking portions 821, W, is increased to or beyond approximately 50% of the repeat dimension, L, it becomes possible to perceive depth in the images displayed on the first LCD panel 810. As the width of the light-blocking portions 821, W, is increased further, clarity is improved at the expense of brightness as the barrier grid obscures a higher percentage of the image display panel. Experimental results show that an improved tradeoff between clarity and brightness is achieved at approximately W/L=80%. At this level of W/L, the images viewed on the first LCD panel 810 enable depth perception and are bright and clear for an improved viewing experience. Further, because the human brain integrates visual inputs, the zone over which depth in moving images are perceived is an extended zone that depends on the size and resolution of the display panel and the dimensional parameters of the barrier grid. As examples, the range over which depth may be perceived extends from 18" to 15' for 23"-diagonal displays and 3' to 18' for 55"-diagonal displays.

In an exemplary embodiment, the grid characteristics of a dynamically configurable barrier grid may be configured to match the size of the image display panel 810. Exemplary embodiments may determine or receive the size of the image display panel 810, and automatically determine the grid parameters that are suitable for an image display panel of that size.

In an exemplary embodiment, the grid characteristics of a dynamically configurable barrier grid may be configured to determine the best viewing distance of a viewer from the image display panel 810.

In an exemplary embodiment, the grid characteristics of a dynamically configurable barrier grid may be configured to set or alter the brightness of images viewed on the image display panel 810. Exemplary embodiments may increase the width of the light-blocking portions 821 relative to the width of the light-transmitting portions 822 of the barrier grid in order to decrease the brightness of the images viewed and, conversely, may decrease the width of the light-blocking portions 821 relative to the width of the light-transmitting portions 822 of the barrier grid in order to increase the brightness of the images viewed. In an exemplary embodiment, a brightness setting may be received from a user or from a processing device or module external to the second display panel 820 and, in response, the grid characteristics of the barrier grid may be altered to achieve the brightness setting. In an exemplary embodiment, an ambient or room brightness may be detected (e.g., using a light sensor) and a desired brightness of images in the display system may be determined based on the ambient brightness. For example, in a dimly lit room, the image brightness may be adjusted downward to improve the viewing experience. Based on the image brightness determined based on the ambient brightness, exemplary embodiments may, in turn, configure the grid characteristics of the barrier grid to achieve the desired image brightness.

Once the grid characteristics of the dynamically configurable barrier grid are configured, the spacing between the image display panel 810 and the second LCD panel 820 displaying the barrier grid, S, may be varied to yield a range over which autostereoscopic 3D images are observed. For example, the desired viewing distance for a gaming device might be less than that for a large TV.

Figure 9A:
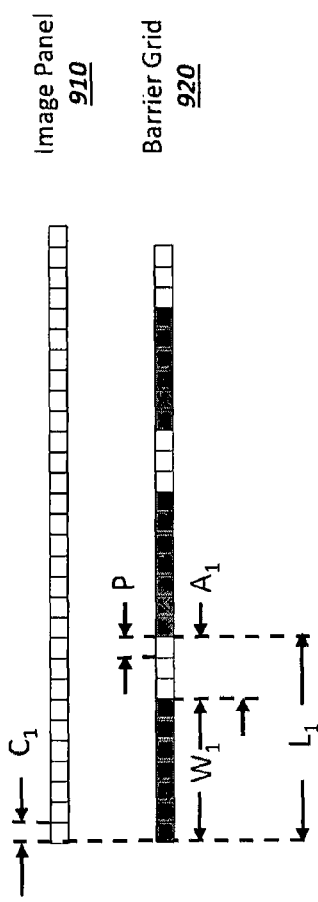
FIG. 9a illustrates an exemplary dynamically configurable barrier grid, e.g., formed on an LCD panel, used with a first image display panel.

In an embodiment, the occluding pixels of a dynamically configurable barrier grid may be selected to conform to image display panels having differing column pitch values. This allows the same display panel for displaying a dynamically configurable barrier grid to be configured to and be used cooperatively with different image display panels having different values of the column pitch. As shown in FIG. 9a, a first image display panel 910 having a column width of $C_1$ is provided. A barrier grid 920 having a column width P and a repeat dimension of $L_1$ is provided cooperatively with a first image display panel 910. The repeat dimension of the barrier grid, $L_1$, in the example shown is equal to 10 barrier grid column widths, P. In the example shown, the column width P of the barrier grid 920 is configured to be substantially equal to the column width $C_1$ of the first image display panel 910. Three columns of the barrier grid are selected to be transparent, yielding a clear aperture of $A_1=3P$ and seven pixels are selected to be opaque, yielding a barrier that occludes $W_1=7P$. The barrier grid 920 is configured so that the ratio of the clear aperture selected to the repeat dimension, $A_1/L_1$, is 30%. The width of each light-transmitting portion, A, corresponds to the combined width of three image display panel columns, $3C_1$ (and similarly, to three barrier grid columns 3P). As an example, the first image display panel 910 may have 1280 columns across a 48" horizontal width, with each column being 0.0375" wide. The display, therefore, has 26⅔ columns/inch.

Figure 9B:
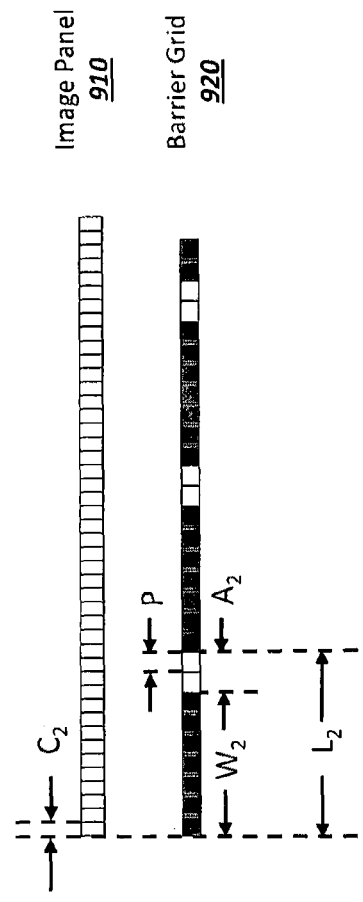
FIG. 9b illustrates an exemplary dynamically configurable barrier grid, e.g., formed on an LCD panel, used with a second image display panel.

FIG. 9b shows the same barrier grid LCD panel used with a second image display panel having a smaller column width, $C_2$, corresponding, for example, to a panel having 1920 columns. The horizontal extent of the image display panel is again assumed to be 48". Thus, each column of the second image display panel is 0.025" in width, corresponding to about 40 columns/inch. FIG. 9b shows two barrier grid columns being transparent, yielding a clear aperture of $A_2=2P$. In this example, the repeat distance of the grid, $L_2$, is equal to nine barrier grid LCD columns, again yielding a barrier width $W_2=7P$. Each of the repeat distance, L, barrier width, W, and clear aperture, A, may be selected to be an integral number of barrier grid LCD column widths, subject to the constraint that $L=A+W$.

Figure 10:
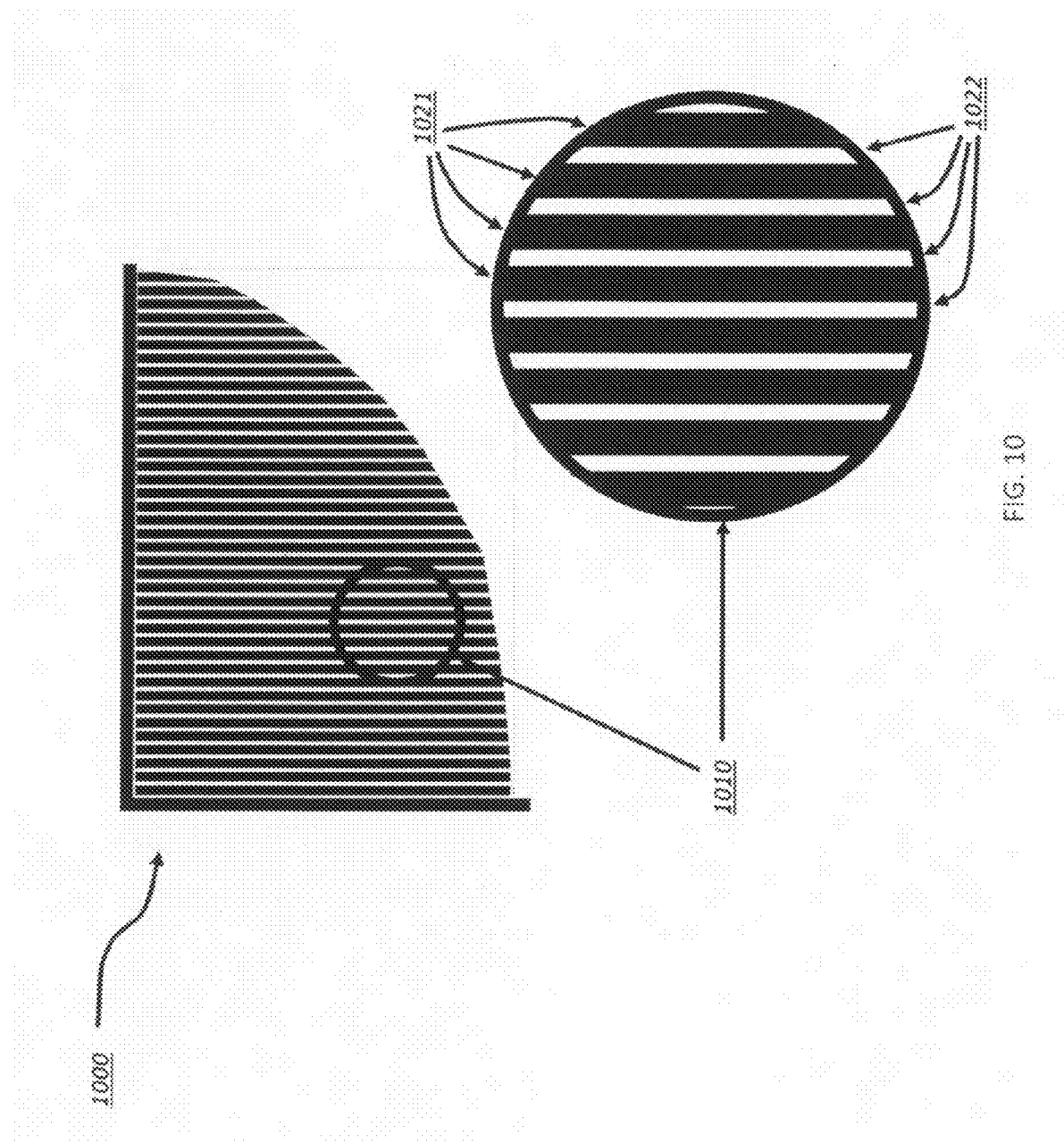
FIG. 10 illustrates an exemplary dynamically configurable barrier grid projected onto the rear side of a 3D display, forming stripes of backlight.

FIG. 10 shows an upper left portion of an exemplary barrier grid 1000 comprising alternating light-blocking columns 1021 and light-transmitting columns 1022 from a small section 1010 of the barrier grid 1010. The circular inset at the lower right of FIG. 10 shows an expanded view of the grid structure. Corresponding to FIG. 1, the width of the light-blocking columns is denoted by W and the width of the clear or light-transmitting columns is denoted by A. The repeat dimension is denoted by L. As one example, the repeat dimension L could be approximately 16 lines/inch and the ratio of W:A may be about 80:20. The values of parameters W, A, and L may be defined and adjusted to sub-pixel dimensions.

Certain surprising results were discovered in exemplary autostereoscopic display methods and systems. One such surprising result is that, in viewing autostereoscopic moving images, depth can be perceived even if the images are not precisely calibrated to the barrier grid. Another surprising result involves the perceived loss in light due to the introduction of light-blocking portions in an exemplary barrier grid. With a barrier grid with a width ratio between the light-blocking and light-transmitting portions of about 4:1, one would expect an 80% light loss. However, the perception is that the loss of light is about 50%, which is surprisingly advantageous.

Figure 11A:
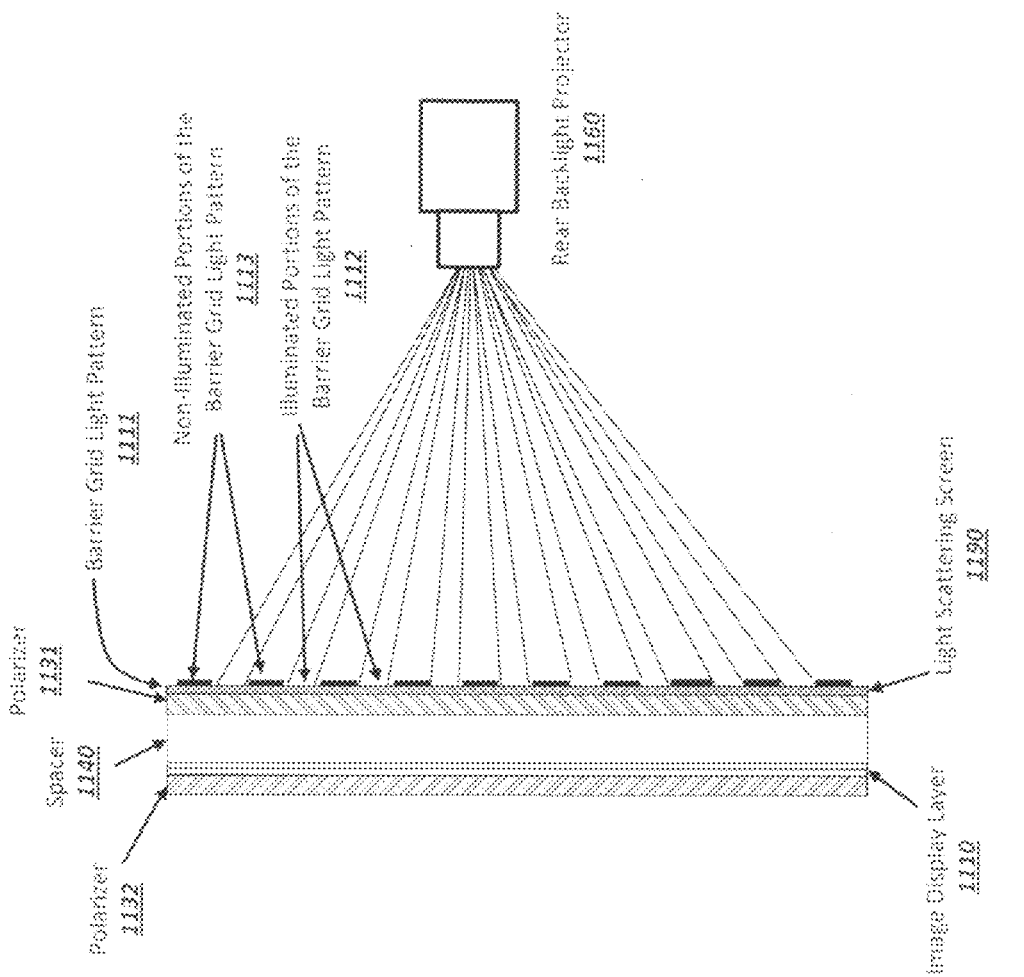
FIG. 11a is a schematic diagram of an exemplary configuration in which a dynamic barrier grid is formed by a backlight pattern projected onto the rear side of an LCD image display panel by a rear projector.

FIG. 11a and FIG. 11b show exemplary embodiments in which a dynamic barrier grid is formed by a backlight pattern 1111 projected onto the rear side of an LCD image display panel 1110 by a rear projector 1160. This approach eliminates the need for use of an LCD panel as the variable barrier grid. The backlight pattern may be projected from the rear of the display, as shown in FIGS. 11a and 11b, or may be created otherwise, such as by using light guides with LED or fluorescent lamp sources to create the required illuminated and non-illuminated areas on the rear of the display. The illuminated portions of the backlight pattern as projected onto the rear of the display panel, 1112, function as the light-transmitting areas of a barrier grid; the non-illuminated portions of the backlight pattern, 1113, function as the opaque or light-blocking areas of the barrier grid. The pattern projected has dimensional parameters (barrier grid repeat distance, barrier grid width, and clear aperture) that are selectable and configurable to provide depth perception to a viewer positioned in front of the image display panel 1110. A spacer 1140 may be positioned between a rear polarizer 1131 on the LCD image display panel, forming multiple layers comprised of rear polarizer 1131, spacer layer 1140, image display layer 1110 (which may be an LCD panel), and front polarizer 1132, as shown in FIG. 11a. Alternatively, as shown in FIG. 11b, the spacer layer 1140 may be formed on the rear of a complete image display panel 1170, i.e., one that is formed of an LCD layer 1180 between front and rear polarizers, 1132 and 1131. In both cases, a light scattering layer 1190 may be formed on the rear side of the structure in order to define the plane of the barrier grid.

Figure 12:
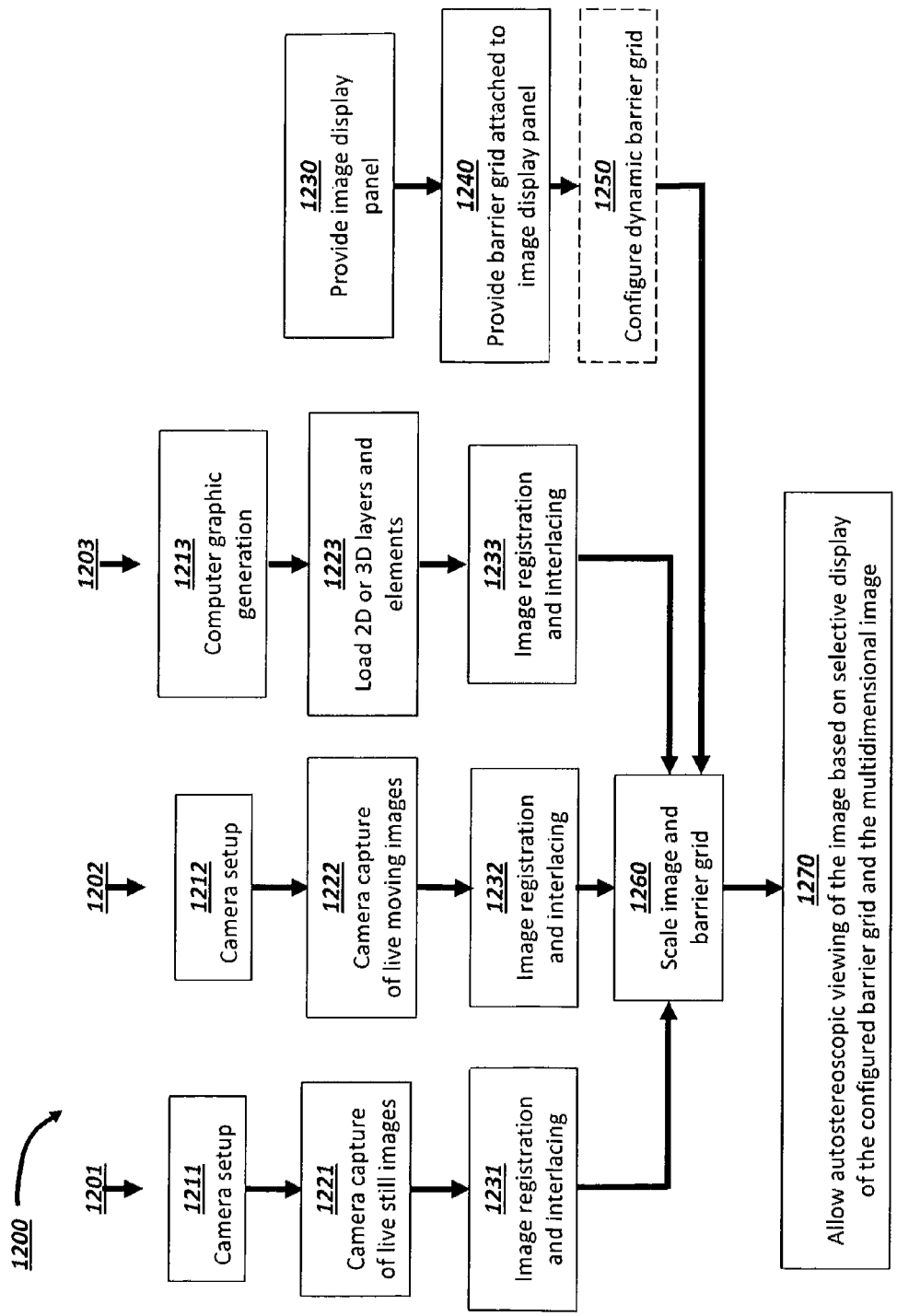
FIG. 12 is a flowchart of an exemplary method in which a plurality of images may be captured and displayed in an exemplary autostereoscopic display system that includes an image display panel and a dynamically configurable barrier grid.

Embodiments of the autostereoscopic systems and methods described herein may use as input still or moving images captured by cameras or provided from data storage devices including, but not limited to, DVD, Blu-Ray, magnetic harddrives, and semiconductor memory. Alternatively, input may be provided by computer graphic generation. in which multiple layers of 2D or 3D elements are converted into data to be provided to the columns of the image display panel for autostereoscopic viewing. FIG. 12 shows an exemplary method 1200 by which still images captured by a plurality of cameras, moving images captured by a plurality of cameras, or computer rendered images may be displayed to allow autostereoscopic viewing on a display comprising an image display panel and a dynamically configurable barrier grid.

Live still images may be captured by a plurality of cameras, shown as process 1201. In a preferred embodiment, the number of still cameras is 20 although fewer or greater numbers of cameras may be used. Prior to image capture, a setup process shown in step 1211 positions and orients each of the cameras correctly, equalizes the focal length and zoom ratio of the lenses, and deactivates camera servo mechanisms such as autofocus and image stabilization. The live still images are captured in step 1221. The captured images are registered to the planar point or centroid and the images are interlaced, as shown in step 1231. In this context, an interlaced image is one containing fields of a frame acquired from two or more points-of-view or viewing angles.

In step 1230, an image display panel is provided. In step 1240, a dynamically configurable barrier grid is provided cooperatively with the image display panel to enable 3D autostereoscopic viewing of still and moving images. In one exemplary embodiment, the dynamic barrier grid is configured to selected parameters in step 1250. In other exemplary embodiments, the barrier grid is static rather than dynamic. The image displayed on the display panel and the barrier grid may be scaled to one another based on the grid indicia of the barrier grid, as shown in step 1260. In step 1270, still and/or moving images may be viewed in an autostereoscopic manner using the cooperative configuration of the image display panel and the barrier grid.

In another embodiment, live moving images may be captured by a plurality of cameras, shown as process 1202. In a preferred embodiment, the number of still cameras is approximately six although fewer or greater numbers of cameras may be used. Prior to image capture, a setup process shown in step 1212, which may be similar or identical to process 1211, positions and orients each of the cameras correctly, equalizes the focal length and zoom ratio of the lenses, and deactivates camera servo mechanisms such as autofocus and image stabilization. The captured images are registered to the planar point or centroid and the images are interlaced, as shown in step 1232, which may be similar or identical to step 1231. The images are registered to the planar point or centroid and the images are interlaced, as shown in step 1231. In this exemplary embodiment, steps 1230, 1240, 1250, 1260, and 1270 may be performed to enable autostereoscopic viewing of the moving 3D images.

In another embodiment, three-dimensional images are rendered by compositing multiple layers of 2D or 3D images using a computing device, as shown in process 1203. 2D and/or 3D layers and elements are input into a computing device, shown as step 1213, and the images are registered to the planar point or centroid and interlaced, shown as step 1233. In this exemplary embodiment, steps 1230, 1240, 1250, 1260, and 1270 may be performed to enable autostereoscopic viewing of the 3D images rendered or generated by the computing device.

Figure 13:
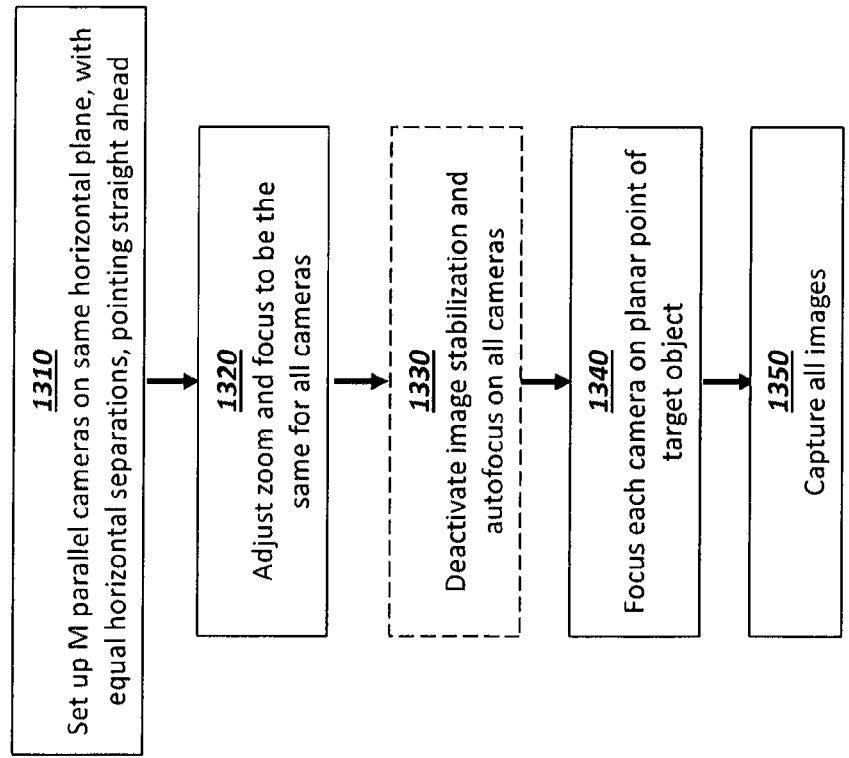
FIG. 13 is a flowchart of an exemplary method for setting up multiple image acquisition devices to capture a plurality of images of an object.

FIG. 13 is a flowchart of an exemplary method of an image camera setup process, which may be used for either process 1201 or 1203 shown in FIG. 12. As shown in step 1310, M cameras are set up in parallel, on the same horizontal plane, separated by equal horizontal distances, and pointed straight ahead. In preferred embodiments, M is 20 for still image capture and six for moving image capture. In step 1320, the focal lengths and zoom ratios are set to be the same all M cameras. In a preferred embodiment, servo mechanisms, including autofocus and image stabilization, are deactivated in step 1330. In step 1340, all cameras are focused on the planar point of the object. In step 1350, all images are captured at the same moment. For capture of still images of static scenes, the images may be captured either at the same moment or at different times.

Figure 14:
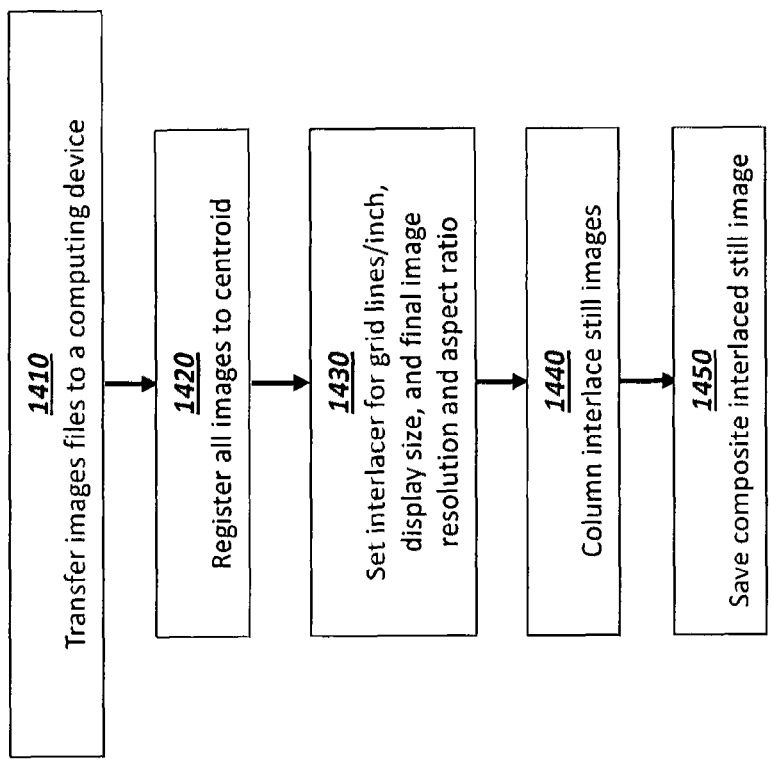
FIG. 14 is a flowchart of an exemplary method for registering and interlacing a plurality of images to form a composite interlaced image.

FIG. 14 is a flowchart of an exemplary method of image registration and interlacing of composite still images. Live or stored still images are transferred to a computing device in step 1410. The images are registered to a centroid in step 1420 and loaded into an interlacer 1430. The interlacer may be hardware or software loaded into a computing device. Exemplary software is Lenticular Image Creator. The interlacer parameters are adjusted for the grid lines per inch, display size, and final image resolution and aspect. The images are column interlaced in step 1440 and saved in step 1450.

Figure 15:
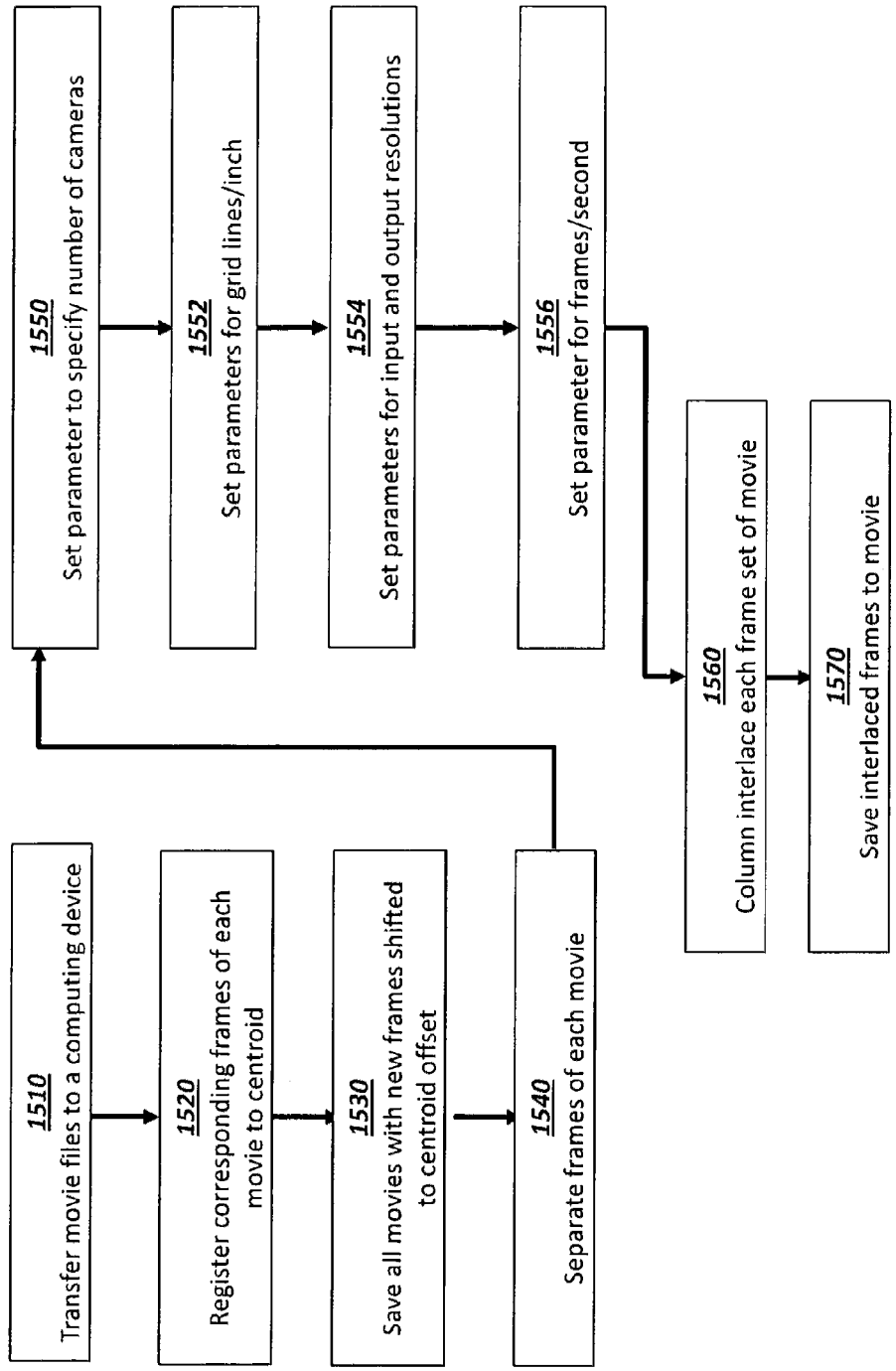
FIG. 15 is a flowchart of an exemplary method for registering and interlacing a plurality of moving images to form a composite moving image.

FIG. 15 is a flowchart of an exemplary method of image registration and interlacing of the composite moving images. Live or stored movie files are transferred to a computing device in step 1510. A movie file, as used herein, is comprised of all moving image files, e.g., movies captured on film or digitally, video, or games. The corresponding frames of each movie file are registered to a centroid in step 1520. The movie files with shifted centroids are saved in step 1530. The frames of each movie are separated in step 1540. The interlacer is set for number of cameras in step 1550, for the grid lines per inch in step 1552, for input and output resolutions in step 1554, and for frames/second in step 1556. Each frame set of the movie is column interlaced in step 1560 and the interlaced movie is saved in step 1570.

The previously described method registers and interlaces images acquired using cameras. Computer rendered images may also be captured and interlaced in the exemplary method of FIG. 16. The word "virtual" in the following description relates to a processor-generated 3D-environment.

Figure 16:
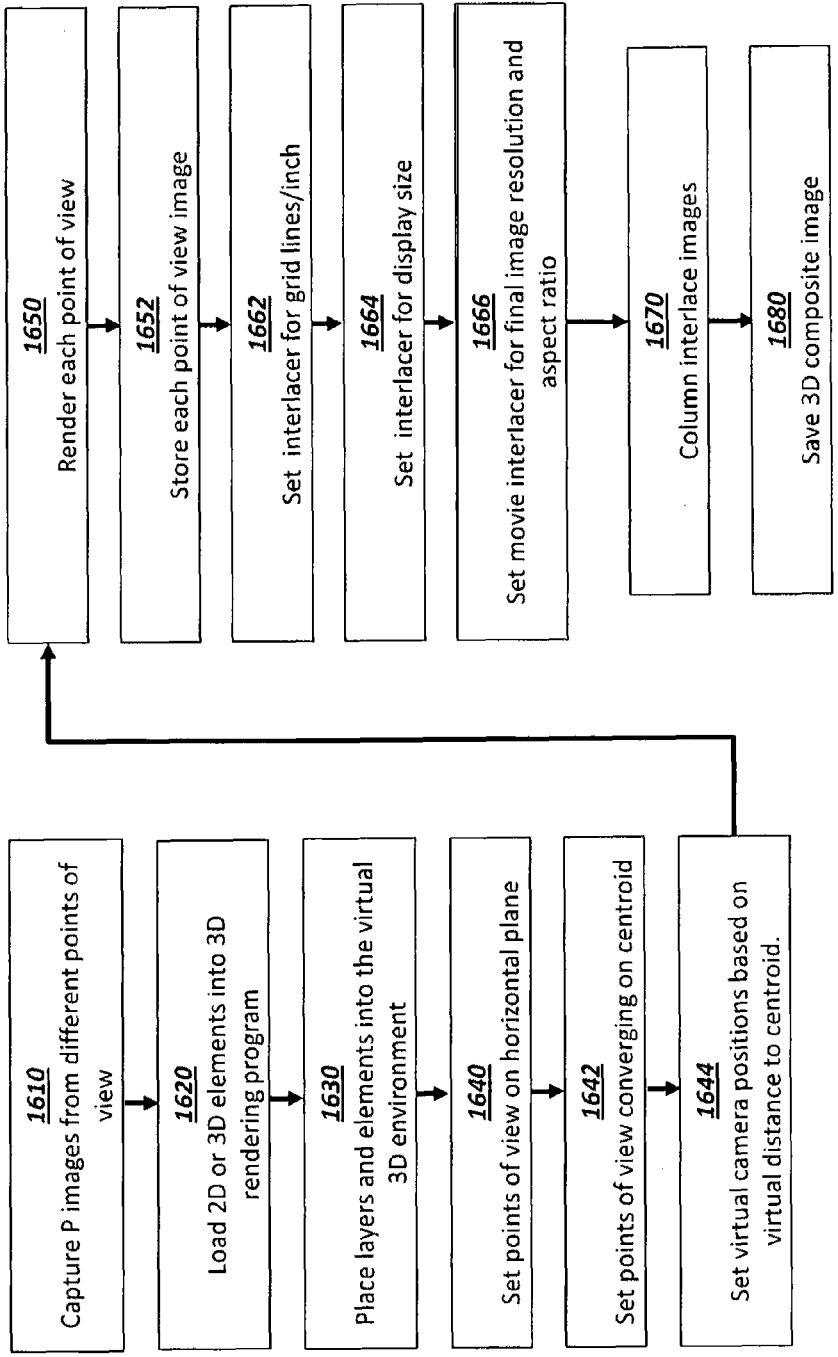
FIG. 16 is a flowchart of an exemplary method for registering and interlacing a plurality of images rendered by computer graphics.

FIG. 16 is a flowchart of an exemplary method of image registration and interlacing of the 3D images rendered by a computing device. Multiple images, P, are captured or acquired from different points of view in step 1610. 2D or 3D elements are loaded into a 3D rendering program in step 1620. In preferred embodiments, P may be 20 to 30 layers. In step 1630, the P images, which constitute layers of the 3D image, and the loaded elements are placed into a virtual 3D environment. Step 1640 sets the points of view on a horizontal plane and step 1642 sets the points of view to converge on the centroid. Step 1644 sets the virtual camera positions based on their virtual distance to the centroid. Each point of view is rendered in step 1650 and stored in step 1652. The image files are transferred to an interlacer, which is set for grid lines per inch in step 1662, for display size in step 1664, and for final image resolution and aspect ratio in step 1666. The image files are column interlaced in step 1670. The 3D composite image is saved in step 1680.

Figure 17:
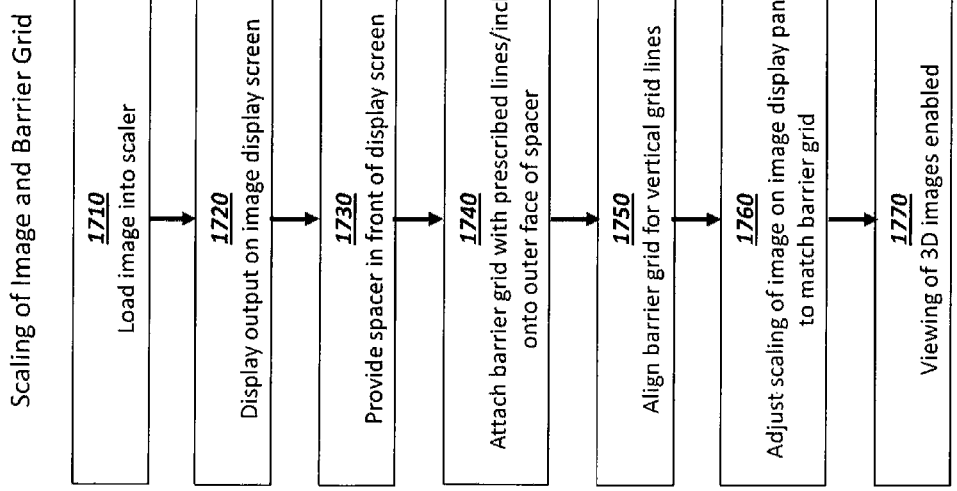
FIG. 17 is a flowchart of an exemplary method for calibrating and/or scaling an image to match a barrier grid, and/or for calibrating and/or scaling a dynamically configurable barrier grid to match an image.

FIG. 17 is a flowchart of an exemplary method of scaling the image formed on the image display panel to the barrier grid. This method is applicable to scaling of still and moving images as well as computer rendered images. The composite image is loaded into the scaler in step 1710. The image is displayed on the image display panel in step 1720. In step 1730, a spacer of prescribed optical thickness S is provided in front of the image display panel. A barrier grid comprising light-transmitting and light-blocking vertical stripes with a prescribed spatial frequency is provided onto the face of the spacer in step 1740. The range of spatial frequencies is typically between 12 and 30 lines/inch with lower spatial frequency lines/inch corresponding to larger displays and higher spatial frequency lines/inch corresponding to smaller displays. For example, a 55" diagonal 1080p image display may require a barrier grid having approximately 16 lines/inch whereas a tablet may require a barrier grid having approximately 30 lines/inch. In step 1750, the barrier grid is aligned so that its stripes are vertical as referenced to the columns of the image display panel. In step 1760, the scaling of the image displayed on the image display panel is adjusted to match the spatial frequency of the stripes of the barrier grid enabling viewing of 3D images, as shown in step 1770. The images may be viewed from any angle within ±75 degrees of the normal to the display and at distances ranging from about 3 feet to about 18 feet.

Figure 18:
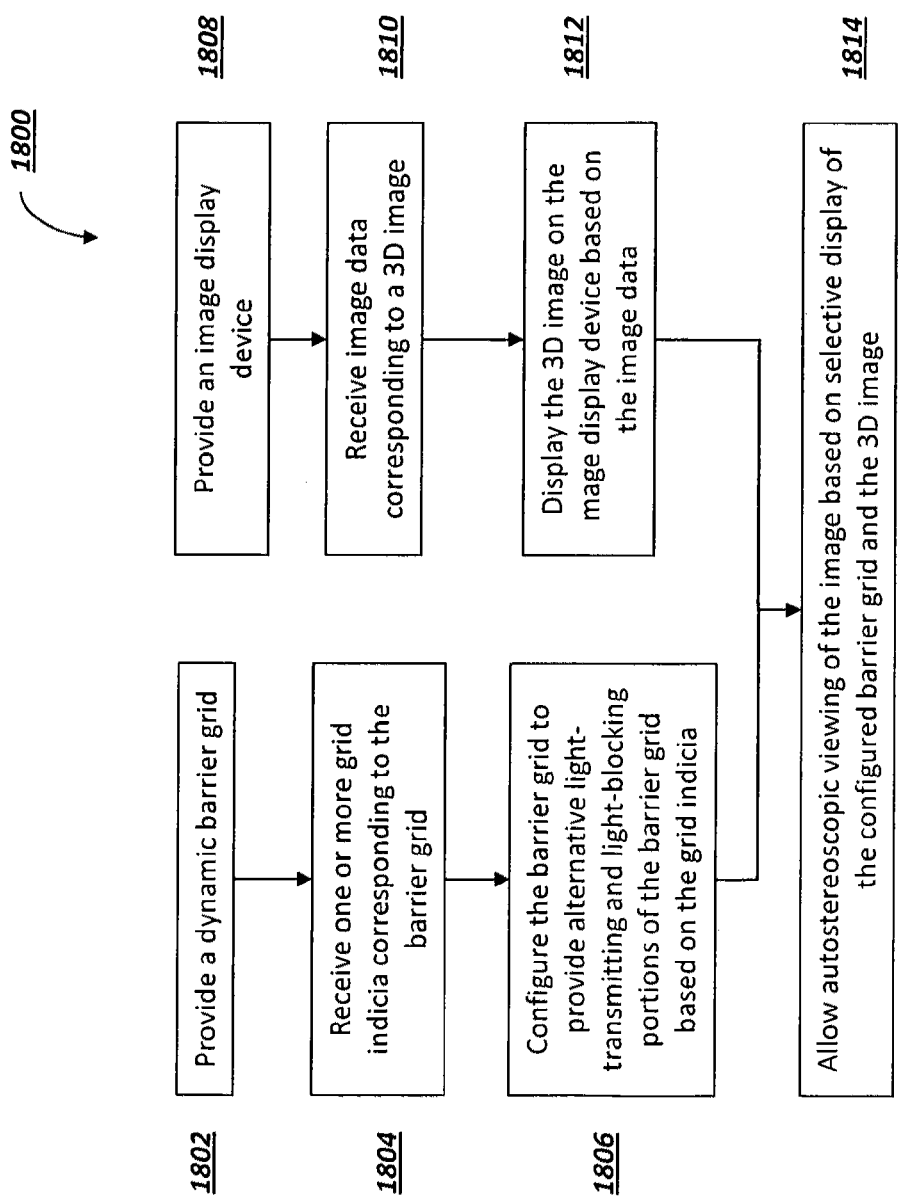
FIG. 18 is a flowchart of an exemplary method that may be performed to allow viewing of an autostereoscopic image of an object.

FIG. 18 is a flowchart of an exemplary method 1800 that may be performed to allow viewing of an autostereoscopic image of an object. In step 1802, an exemplary dynamically configurable barrier grid may be provided. In step 1804, one or more grid indicia corresponding to the dynamic barrier grid may be received from, for example, from a configuration mechanism that may be used to configure the dynamic barrier grid. The grid indicia may be specified by a user, a programmer, or may be automatically determined by exemplary embodiments. The grid indicia may be provided in any suitable data structure, computer-executable instruction or format. For example, the grid indicia may be provided in a file header for a file that may also include image data, in a side image of image data, as a separate frame in a sequence of frames that includes image data, in a single frame along with image data, and the like.

In step 1806, the dynamic barrier grid may be configured based on the grid indicia. More specifically, one or more aspects of the barrier grid may be configured. These aspects may be include, but are not limited to, a ratio of the width of the light-transmitting portions to the width of the light-blocking portions, the width of the light-transmitting portions, the width of the light-blocking portions, the dimensions of the barrier grid, the repeat dimension of the barrier grid, and the like.

In step 1808, an image display device may be provided. In exemplary embodiments, the image display device may be provided separately from or integrally with the dynamic barrier grid. In step 1810, image data corresponding to a composite image may be received at the image display device. In step 1812, the composite image may be displayed at the image display device based on the image data. The composite image may be selectively displayed in conjunction with the dynamic barrier grid.

In step 1814, the composite image may be viewed in a 3D autostereoscopic manner based on the conjunction of the display of the image and the barrier grid.

Figure 19A:
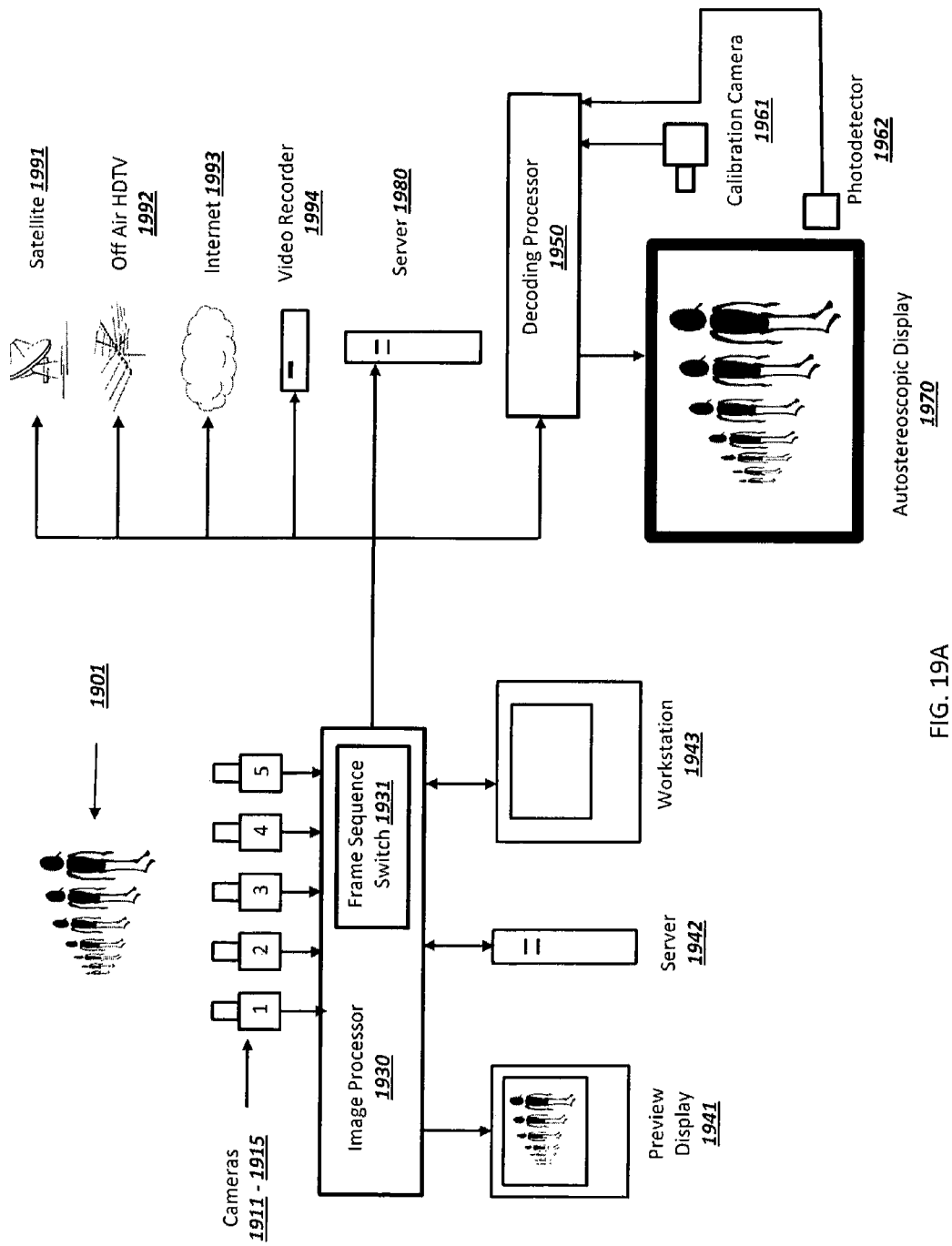
FIG. 19a illustrates an exemplary image capture and autostereoscopic image display system.

FIG. 19A depicts an exemplary embodiment of an autostereoscopic composite image capture and display system in which a plurality of cameras provide digital image data to an image processing system that includes a frame grabber. Multiple digital cameras, e.g., 1911-1915 as shown in FIG. 19A, are arranged to capture images of a three-dimensional scene 1901. A plurality of images (e.g., five or six) is captured at the same moment using the plurality of cameras. The Sanyo FH-1, which has a relatively narrow width of 53 mm, is an example of an appropriate choice of camera. The camera resolution is preferably selected to be 1080p for still images or moving images. In an exemplary embodiment, all cameras are mounted on a common mechanical support and adjusted so they are on the same horizontal leveled plane and are separated by approximately equal distances in the horizontal direction. The horizontal separation of the cameras is determined by their distance from the subject.

Figure 25:
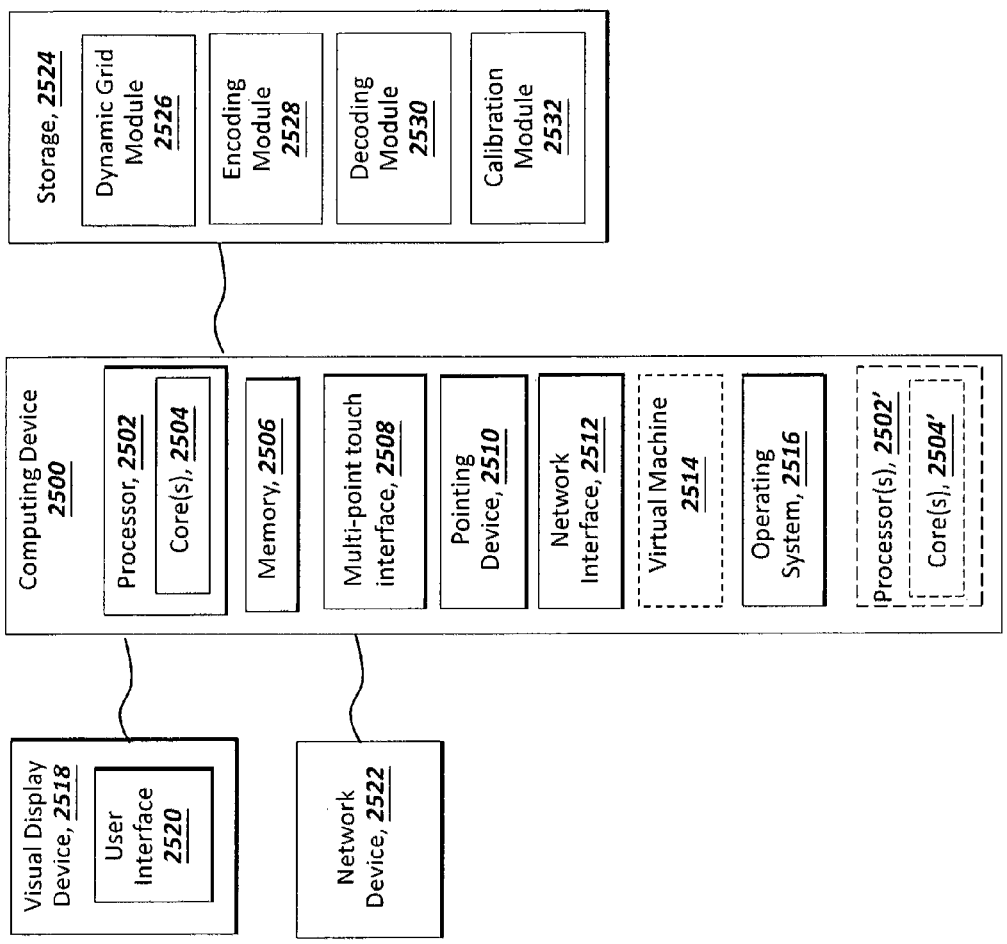
FIG. 25 is a block diagram of an exemplary computing device configurable to perform any of the methods and/or to implement any of the systems taught herein.

The outputs of the plurality of cameras are each provided as inputs to an image processor 1930, which is the equivalent of the computing devices 330 and 430 of FIGS. 3 and 4, respectively, and described more generally as computing device 2500 of FIG. 25. Incorporated in image processor 1930 are frame grabbers and an adder. Also, incorporated in the image processor 1930 is a switch 1931 that enables selection of a 2D image or a 3D image or which may be used to select a barrier grid indicia image. A 2D image may be selected, for example, by using only the output from one camera among the plurality of camera, e.g., camera 3 of FIG. 19. A 3D image composed of a composite of the plurality of input camera images may be selected by use of the switch. Generation of the composite 3D image is described in further detail below. A grid indicia image may be extracted from instructions stored in the computing device that performs image processing.

Switch 1931 may be selected either manually or automatically. The choice of 2D or 3D may be based on display content. For example, static image data may be preferably viewed as a 2D image. In such cases, a variable barrier grid may be set to transmit all light thereby maintaining the native resolution of the image display panel. A fast-moving scene or one in which several rates of horizontal motion can be sensed may be indicative of 3D content and may be preferably viewed as a 3D image. The above examples are not intended to be limiting; various image processing algorithms may be used to sense possible 3D content in an image. The switch, 1931, may be implemented in hardware or software. One example of a hardware implementation is a single-throw toggle switch. Alternatively, software instructions may be used to select either a 2D or 3D input.

In an example wherein the barrier grid includes a plurality of alternating vertical light-transmitting portions and light-blocking portions prior to receiving the display setting, if a display setting specifies 2D display, exemplary embodiments may automatically configure the entire barrier grid to be light-transmitting by removing the light-blocking portion. In an example wherein the entire barrier grid is light-transmitting prior to receiving the display setting, if a display setting specifies 2D display, exemplary embodiments may maintain the entire barrier grid in its light-transmitting state. In an example wherein the entire barrier grid is light-transmitting prior to receiving the display setting, if a display setting specifies 3D display, exemplary embodiments may automatically configure the barrier grid to include the plurality of alternating vertical light-transmitting portions and light-blocking portions. In an example wherein the barrier grid includes a plurality of alternating vertical light-transmitting portions and light-blocking portions prior to receiving the display setting, if a display setting specifies 3D display, exemplary embodiments may automatically maintain the plurality of alternating vertical light-transmitting portions and light-blocking portions in the barrier grid.

Exemplary embodiments may receive image data corresponding to a 2D image and image data corresponding to a 3D composite image for display in the autostereoscopic image display system. In response, exemplary embodiments may automatically configure the entire barrier grid to be light-transmitting when the 2D image is displayed in the autostereoscopic image display system, and automatically configure the barrier grid to include the plurality of alternating vertical light-transmitting portions and light-blocking portions when the 3D composite image is displayed in the autostereoscopic image display system. Exemplary embodiments may receive image data corresponding to a 2D image for display in the autostereoscopic image display system, and automatically configure the entire barrier grid to be light-transmitting. Exemplary embodiments may receive image data corresponding to a 3D composite image for display in the autostereoscopic image display system, and automatically configure the barrier grid to include the plurality of alternating vertical light-transmitting portions and light-blocking portions.

Output from the image processor 1930 may be outputted to and controlled by, any of a number of devices. Examples shown in FIG. 19 include, but are not limited to, a preview display device, 1941 (that displays a preview of a composite image obtained from the plurality of captured images), a server 1942 and/or 1980 (that allows data to be hosted), and a workstation, 1943 (that may be operated by a user to view and/or manipulate image data before the image data is returned to the image processor 1930).

The output of the computing device that performs image processing, 1930, is transmitted to a decoding processor, 1950, which generates data to be displayed on an autostereoscopic image display device, 1970. In FIG. 19, the image shown on the autostereoscopic display, 1970, is a representation of the original subject scene, 1901, which schematically depicts a group of people at different distances or depths from the image acquisition cameras. As part of the decoding process, a calibration pattern generator may be used to generate a pattern on the autostereoscopic display device, 1970. The calibration pattern may be viewed from the front of the display by a calibration camera, 1961, or, in a preferred embodiment, by a photocell, 1962. The calibration pattern or image displayed on the image display panel may be scaled using a micro-scaler to calibrate image display data to the dimensions of the barrier grid in micro-steps. In an exemplary embodiment, only the horizontal dimension of the calibration pattern or image may be resized or changed during the calibration process. In another exemplary embodiment, the vertical dimension of the calibration pattern or image may also be resized or changed during the calibration process based on the resizing of the horizontal dimension in order to preserve the aspect ratio of the image.

If the barrier grid is itself variable in dimension, an alternate embodiment is to scale the dimensions of the barrier grid to the image display data in micro-steps. The micro-steps of said micro-scaling are smaller than the dimension of an individual pixel of image data. As an example, micro-scaling may be performed using micro-steps of 0.0001 inch increments. In an exemplary embodiment, the barrier grid and image display panel are calibrated when the light received or brightness detected by the calibration camera 1961 or photocell 1962 is exactly or approximately at or above a predefined minimum level. In another exemplary embodiment, the barrier grid and image display panel are calibrated when the light received or brightness detected by the calibration camera 1961 or photocell 1962 is within a range of a maximum level. The maximum level of brightness or light may be predefined or determined by the calibration camera or photocell. In an exemplary embodiment, both the vertical dimension and the horizontal dimension of the barrier grid may be scaled or changed during the calibration process. In another exemplary embodiment, only the horizontal dimension of the barrier grid may be scaled or changed during the calibration process.

The output of the image processor 1930 may be transmitted by any means to the decoder processor 1950, including but not limited to over hardwire, the internet, radio waves, microwaves, optical fibers, and by free-space optical links. Alternatively, the output of image processor 1930 may be transmitted to remote locations by any transmission modality, including but not limited to satellite transmission 1991, over-the-air television transmission 1992, or via the internet 1993. The output of the image processor 1930 may also be stored in a storage device, as exemplified in the figure by a video recorder 1994, but which may be any type of data storage device. The output of image processor 1930 may also be transmitted to a server 1980.

Figure 19B:
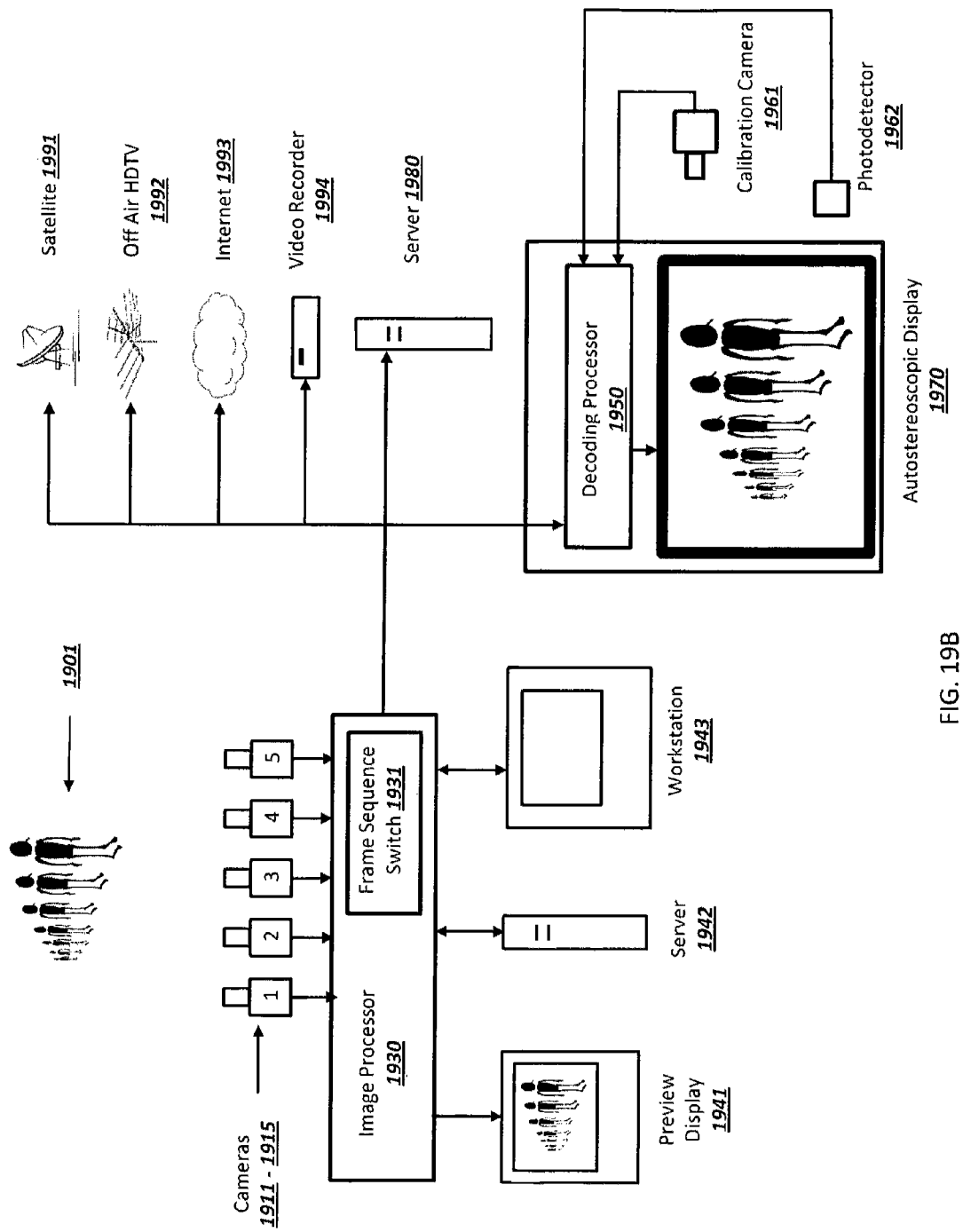
FIG. 19b illustrates another exemplary image capture and autostereoscopic image display system.

FIG. 19B depicts another exemplary embodiment in which the decoding processor 1950 is embedded in the electronics of the display screen 1970.

In an embodiment for still images, a plurality of M cameras is used to capture images of an object or scene from different points of view at one moment in time. The cameras are set to capture images at the same resolution. The cameras are adjusted to be on a horizontal leveled plane. The cameras are adjusted to converge on the image representing the planar depth of the image. Planar depth is defined as the depth of the perceived image that will be displayed at the screen depth, i.e., neither in front of nor behind the screen. The images from each camera are captured in frame buffers. A software matte is applied to occlude a first set of columns of image data from each camera, and to leave a second set of columns un-occluded. For an image acquired from image acquisition device m out of M total image acquisition devices, the second set of columns is every $m^{th}$ column. The resultant un-occluded images from each frame buffer are then added together to form a composite image. The new composite frame is stored as a 3D encoded image.

In an embodiment for moving images, a plurality of M cameras are used to capture sequential images of an object or scene from different points of view frame synchronized to capture image frames at one moment in time for each frame of each camera. The cameras are adjusted to be on a horizontal leveled plane. The cameras are adjusted to converge on the image representing the planar depth of the image. The images from each camera are captured in frame buffers. A software matte is applied to occlude a first set of columns of image data from each camera, and to leave a second set of columns un-occluded. The second set of columns is every $m^{th}$ column. The resultant un-occluded images from each frame buffer are then added together to form a composite image. The new composite frame is stored as a 3D encoded image. Each frame is captured and processed in real time in less than 1/30 second.

Figure 20:
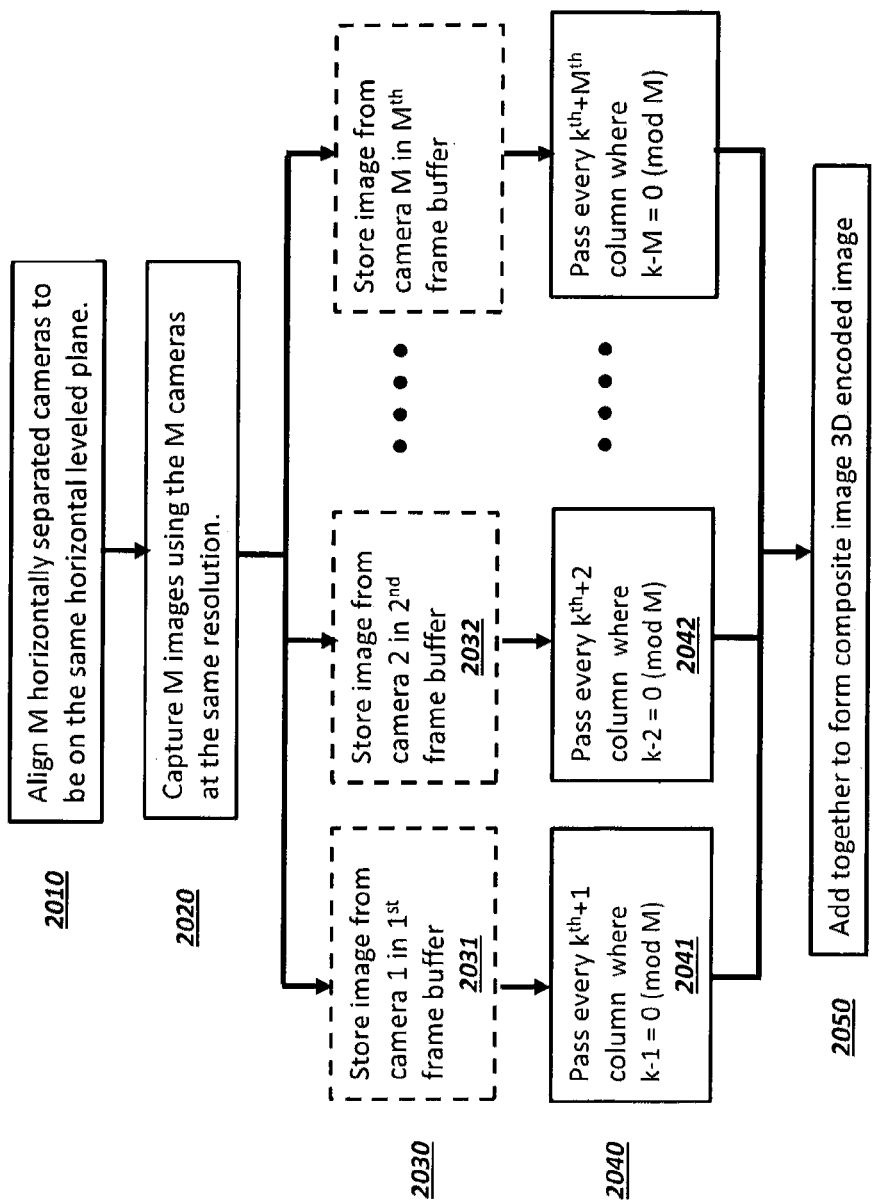
FIG. 20 is a flowchart of an exemplary method for extracting column data from a plurality of images using a software mask to generate a composite 3D encoded image.

Both of the above embodiments are represented by the flow chart of FIG. 20. As shown in step 2010, a plurality of cameras is aligned on the same horizontal, leveled plane, as previously described in FIG. 3 or FIG. 4. The number of cameras may be between 2 and 20 or even greater. A preferred embodiment may comprise five cameras. In a preferred embodiment, each camera captures a 1080p image and has a High-Definition Multimedia Interface (HDMI). Each of the cameras captures an image. Images are captured by each of the M cameras, as depicted in step 2020. The cameras may be synchronized so that the images from each camera are captured at the same moment in time or the captured images may be synchronized by processing the data after capture. If all of the cameras are synchronized to one another, each image may be subjected to a matte or mask that transmits data to the $n^{th}$ column of the image display panel from the $k^{th}$ column of the $m^{th}$ camera of M cameras subject to the aforementioned condition k−m=0 (mod M), as shown, for example, in steps 2040. If the cameras are not synchronized to one another, each of the captured images is stored in one of a plurality of frame buffers, 2030, such that the image generated by a first camera is stored (or grabbed) by a first frame buffer, 2031, the image generated by a second camera is stored in a second frame buffer, 2032, and so on until each of the images from the $M^{th}$ camera is stored in an $M^{th}$ frame buffer. Matte 2040 is applied to the images stored in the frame buffers such that a matte, 2041, is applied to the first stored image, 2031, a second matte, 2042, is applied to the second stored image, 2032, and so on until an $M^{th}$ matte is applied to the $M^{th}$ stored image. Each matte transmits its respective stored image so as to transmit every $m^{th}$ column of the data of the corresponding stored image. The transmitted outputs of each of the stored, matted image data are combined by an adder to generate 3D composite interlaced image data, in step 2050.

Figure 21:
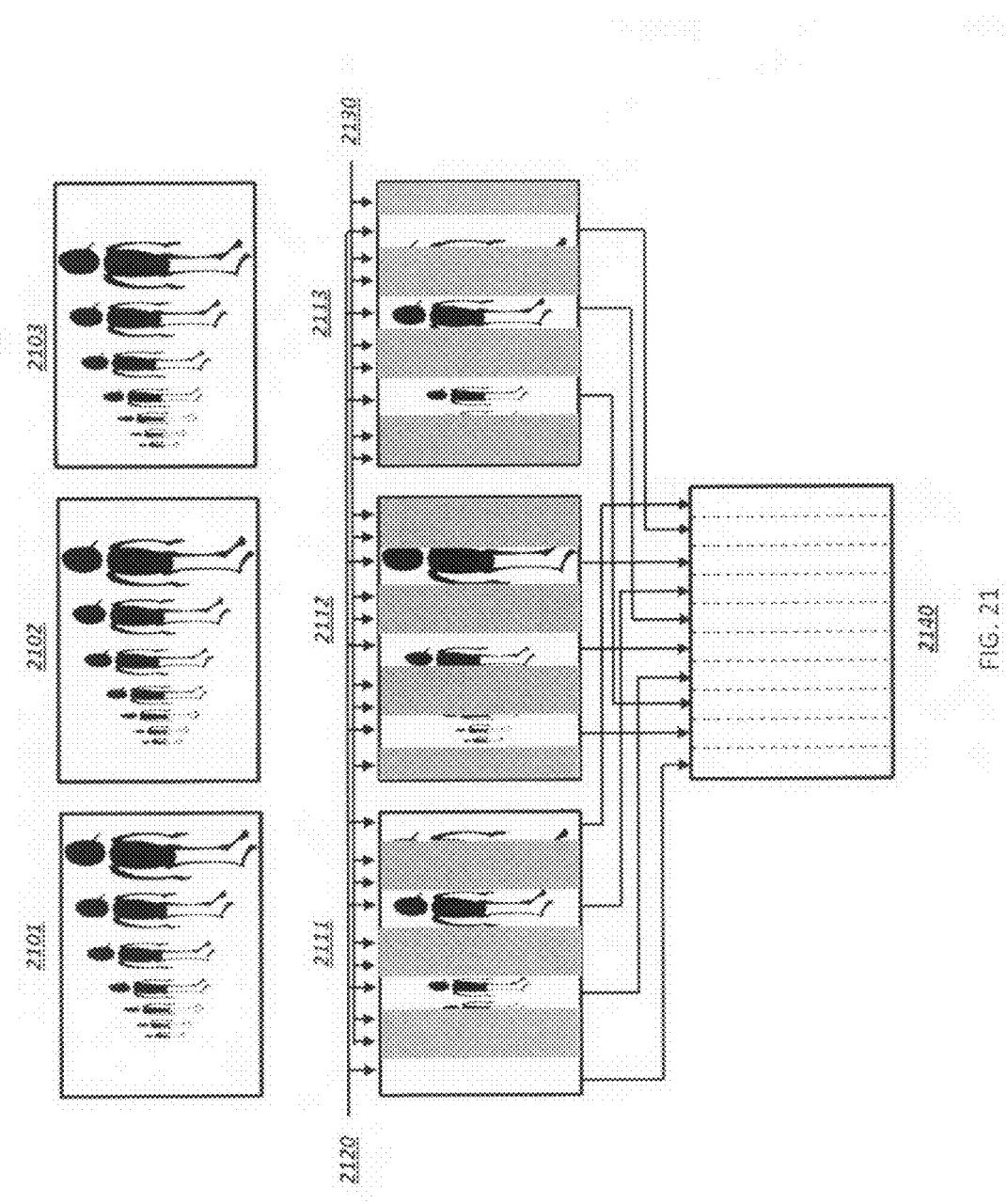
FIG. 21 illustrates an exemplary method of acquiring and processing a 2D image from one of M still or moving images, each from one of M cameras, for 3D encoding and presentation.

An example of use of the method described in FIG. 20 is shown in FIG. 21 for a three-camera system using the configuration of FIG. 4. Cameras 1, 2, and 3 capture images 2101, 2102, and 2103, respectively. Inspection of the exemplary images shows that they are offset from one another by the inter-camera spacing. A mask is applied to these captured images, the mask comprising a series of parallel acceptance areas, 2120, which preserve the corresponding column data of the captured images and a series of parallel rejection areas, 2130, which delete the corresponding column data of the captured images. The rejection areas, 2130, are shown in grey in the figure. The masking areas may be any width. Preferred embodiments may have the mask width equal to an integral number of column widths of the captured image. The masking operation results in masked images, 2111, 2112, and 2113. The data comprising the acceptance areas of the masked images is provided to corresponding columns of the image display 2140. As can be seen in the figure, there is a direct correspondence of the column data of the masked images to that provided to the image display. In addition, as is illustrated in the figure, the acceptance areas of each successive masked image are offset from one another, such that the image data provided to each column of the image display device is provided by a specific acceptance area of only one of the masked images.

Figure 22:
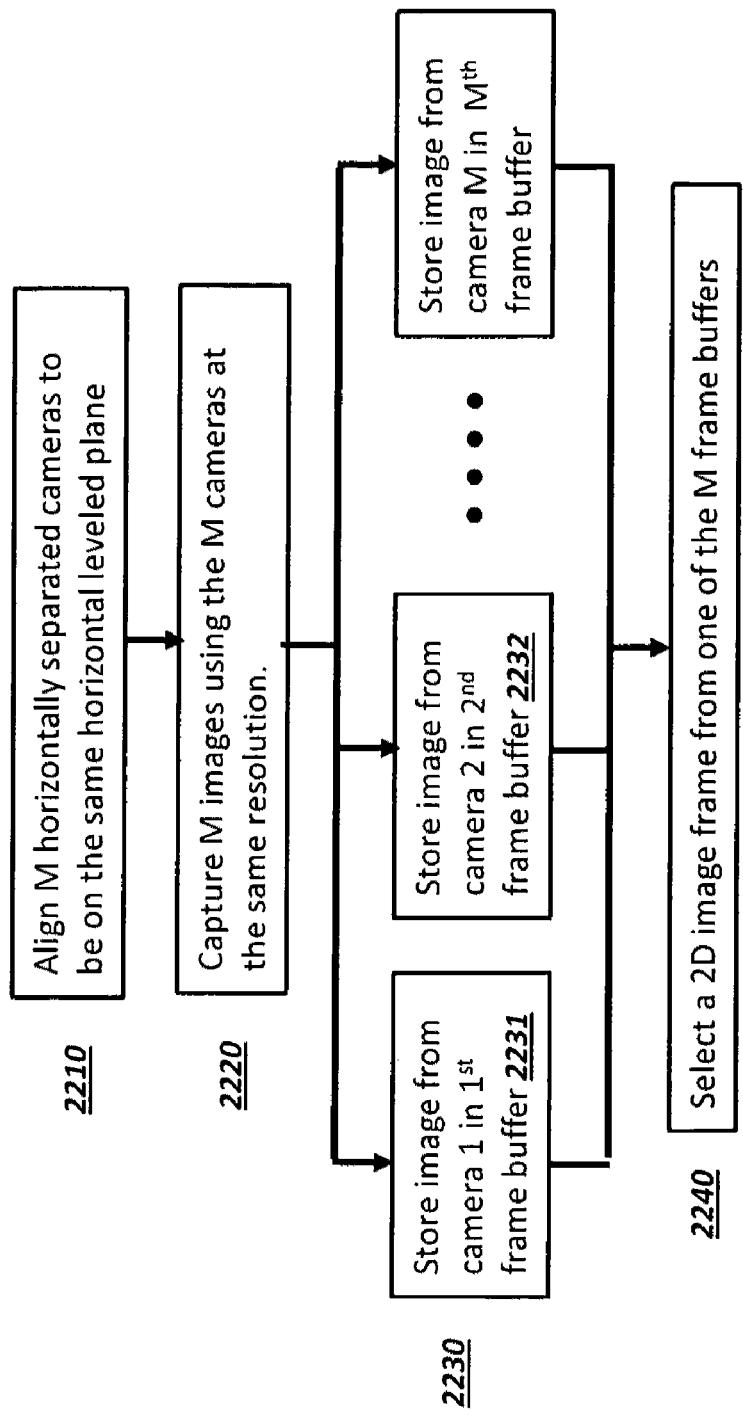
FIG. 22 is a flowchart of an exemplary method for acquiring and processing a 2D image from one of M still or moving images, each from one of M cameras, for 3D encoding and presentation.

In a further embodiment, one of the image frames of one of the cameras is stored as a full frame without the matte as a 2D representation of the scene as shown in FIG. 22. As shown in this figure, M horizontally separated identical cameras are aligned to be on the same horizontal leveled plane, 2210. M images are captured using the M cameras, set to have the same resolution in step 2220. Each of the captured images re stored in a separate frame buffer corresponding to the camera that captured that image, 2230. In step 2240, a 2D image frame is selected from one of the M frame buffers.

The 2D image may be played in sequence with the corresponding 3D encoded frame. The 2D image may be played in the odd frame numbered position of the sequential frames of the movie and the 3D encoded frame may be played in the even frame numbered position of the sequential frames of the movie, thus enabling transmission of both 2D or 3D images to the display and selected viewing of either 2D or 3D images by the viewer.

In an exemplary embodiment, 2D images are sent in the odd-numbered frames and 3D images are sent in the even-numbered frames of a transmission signal. At the receiving location, an interface receives the transmission signal and selects either the 2D images from the odd-numbered frames in the sequence or the 3D encoded images from the even-numbered frames in the sequence. Alternatively, the 2D and 3D image data may be sent in even- and odd-numbered frames, respectively.

In an embodiment, the 2D and 3D encoded images are transmitted to an autostereoscopic display comprised of a dynamically configurable barrier grid. In a dynamically configurable barrier grid, the dimensions of the clear and occluding apertures of the barrier grid are variable or can be made completely transparent, i.e., the grid elements are "turned off". When 2D frames are selected (e.g., the odd-numbered frames), the dynamic barrier grid is turned off allowing for the unencumbered display of 2D images. When the 3D even-numbered frames are selected, the dynamic barrier grid is turned on, allowing for the autostereoscopic display of 3D images.

Figure 23:
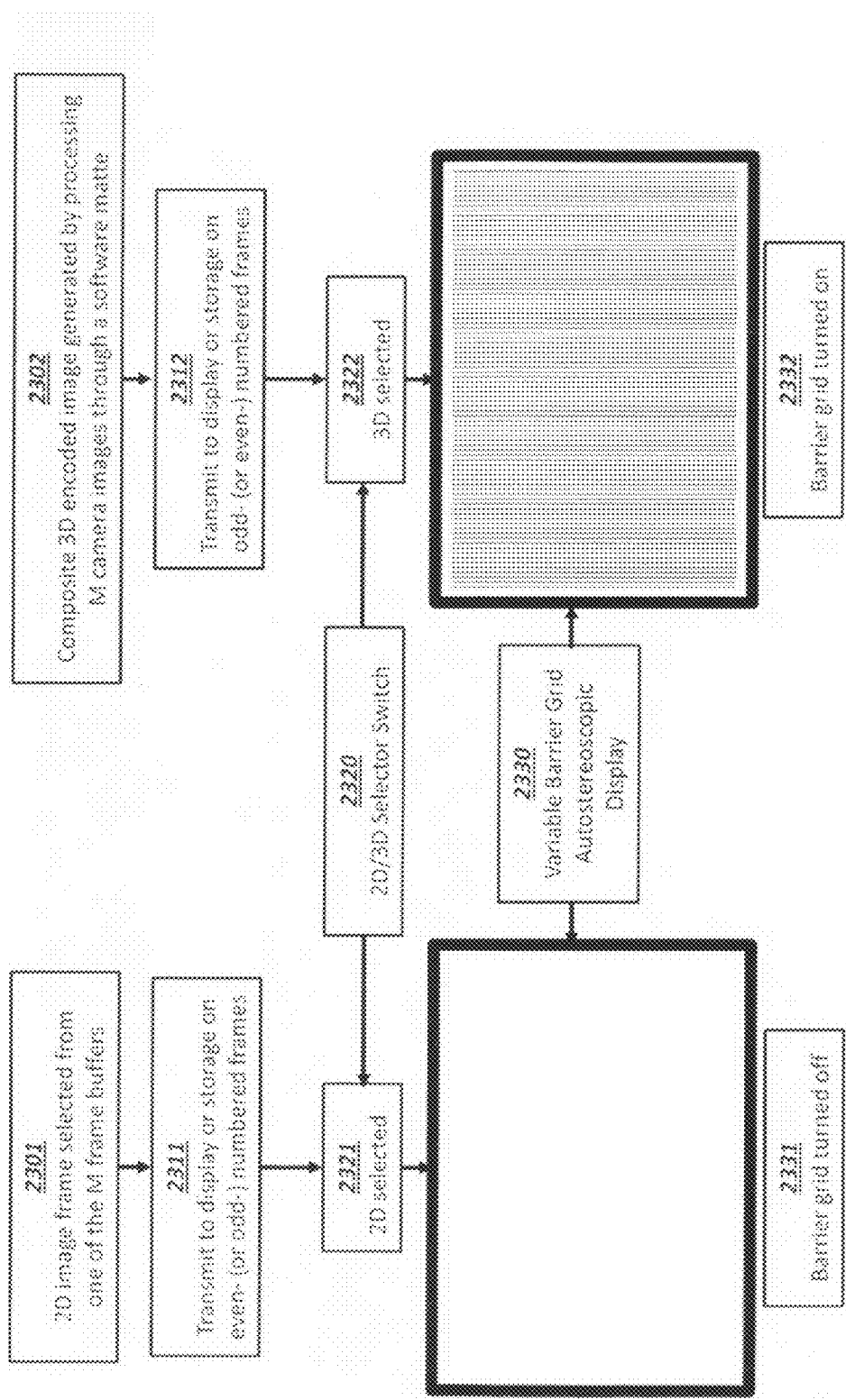
FIG. 23 is a flowchart of an exemplary method of using a 2D/3D selector to select between 2D and 3D autostereoscopic display of images.

Both embodiments are shown in FIG. 23, in which a 2D/3D selector, which may be implemented in hardware or software, is used to select whether 2D or 3D images are to be displayed to the viewer. The selection may be made based on display content, viewer preference, or any other criterion. The selection may be made automatically or manually.

Selector switch 2320 is used to selectively provide either a 2D image or a 3D image to a variable barrier grid display 2330 or, alternatively, to a storage unit (not shown in the figure). A 2D image frame is from one of the M frame buffers in step 2301 is transmitted to be displayed or stored as either odd- or even-frames in step 2311. A composite 3D encoded image generated by processing M camera images through a software matte in step 2302 is transmitted to be displayed or stored as either odd- or even-frames in step 2312. Selection switch 2330 is used to select whether a 2D image or a 3D image is displayed. If a 2D image is selected, as shown in step 2321, the variable barrier grid of the autostereoscopic display 2330 is turned off, as shown by 2331. If a 3D image is selected, as shown in step 2322, the variable barrier grid is turned on, as shown in step 2332.

Figure 24A:
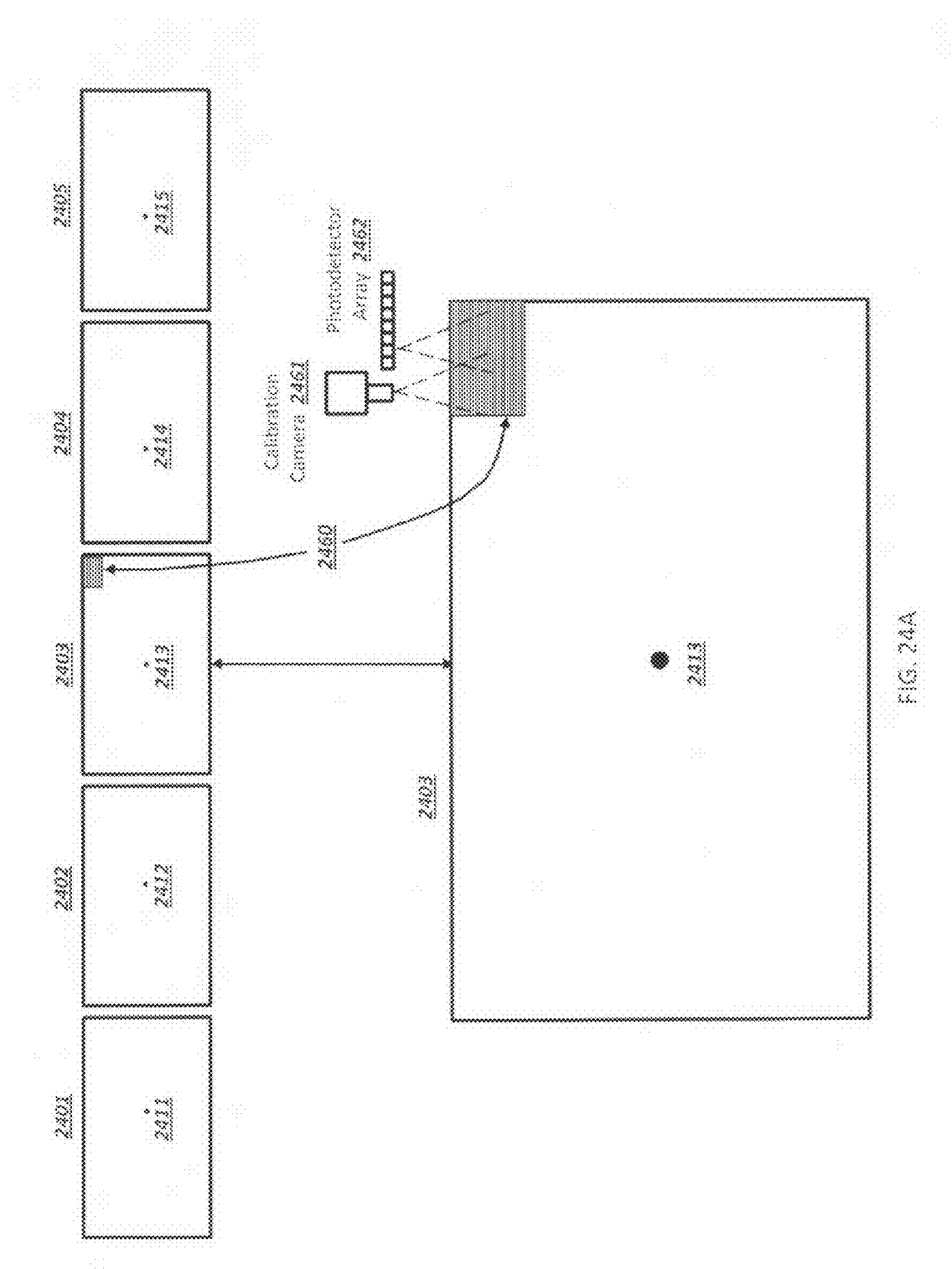
FIG. 24A illustrates an exemplary system for calibrating an image displayed on an image display panel for use with a dynamically configurable barrier grid in an autostereoscopic display system.

FIG. 24A shows an exemplary method of calibrating the image displayed on the image display panel to the barrier grid. FIG. 24A shows the example of five images, 2401, 2402, 2403, 2404, and 2405, which may be acquired from five respective cameras or which may be computer rendered. Each has a respective centroid, shown as 2411, 2412, 2413, 2414, and 2415. A calibration box 2460 is selected on one of the images. In a preferred embodiment, the calibration box 2460 is a rectangle selected in one part of the central image, 2403. In the example shown in FIG. 24A, this rectangle is selected to be in the upper right of image 2403. An expanded view of the central image 2403 and the calibration box 2460 is shown in FIG. 24A. A grey level is selected to be displayed in the calibration area 2460. The calibration box is imaged onto the sensor of a calibration imager, which may be a calibration camera 2461 or a linear sensor array 2462 with appropriate optics (not shown in the figure). The scaling of either the image on the image display panel and/or the variable barrier grid is adjusted until the calibration box is maximally bright, at which point it will also be uniform in brightness. At this point, the columns of the imaged displayed on the display panel align with the barrier grid. A Fourier analysis shows no frequency components at any spatial frequency other than the lowest order corresponding to the width of the calibration box. As an example, for a 55"-diagonal image display panel, the barrier grid spatial frequency is approximately 12 lines/inch.

Figure 24B:
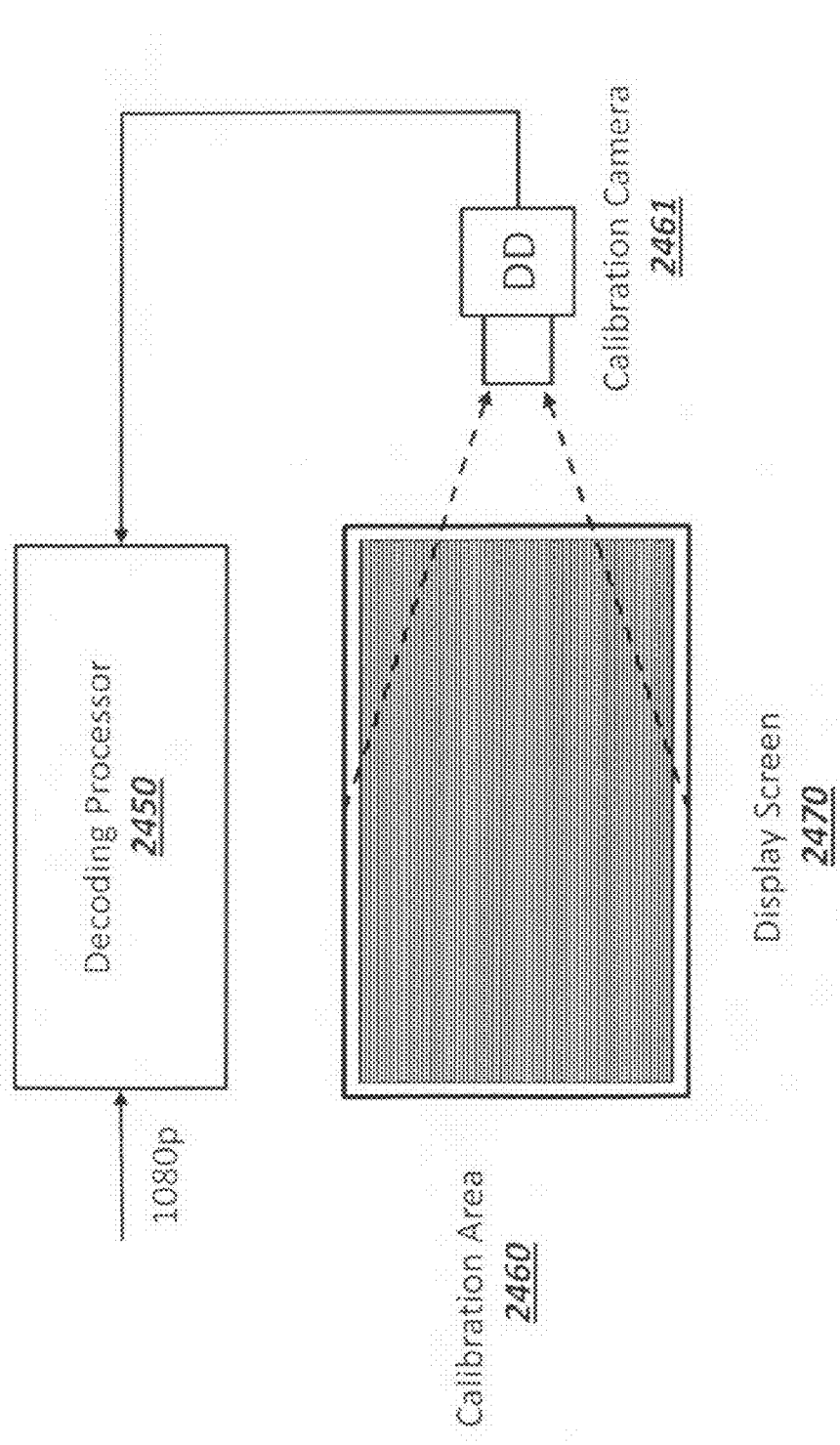
FIG. 24B illustrates another exemplary system for calibrating an image displayed on an image display panel for use with a dynamically configurable barrier grid in an autostereoscopic display system.

FIG. 24B shows an exemplary embodiment of a calibration method in which the calibration area 2460 fills the entire visible extent of the display screen 2470. As shown in this embodiment, the output of a calibration camera 2461 is provided to a decoding processor 2450.

The calibration process may be performed by computing devices and/or other electronic circuitry. Calibration must have the ability to scale up the images to match the monitor size with the required barrier grid in real time.

Exemplary methods may be implemented and executed on one or more computing and/or processing devices. FIG. 25 is a block diagram of an exemplary computing device 2500 that may be used in to perform any of the methods provided by exemplary embodiments. The computing device 2500 may be any suitable computing or communication device or system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 2500 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash drives), and the like. For example, memory 2506 included in the computing device 2500 may store computer-readable and computer-executable instructions, programs or software for implementing exemplary embodiments, for example, for setting up and/or configuring a dynamically configurable barrier grid. Memory 2506 may include a computer system memory or random access memory, such as DRAM, SRAM, EDO RAM, and the like. Memory 2506 may include other types of memory as well, or combinations thereof.

The computing device 2500 also includes processor 2502 and associated core 2504, and optionally, one or more additional processor(s) 2502' and associated core(s) 2504' (for example, in the case of computer systems having multiple processors/cores), for executing computer-readable and computer-executable instructions or software stored in the memory 2506 and other programs for controlling system hardware, for example, for setting up and/or configuring a dynamically configurable barrier grid. Processor 2502 and processor(s) 2502' may each be a single core processor or multiple core (2504 and 2504') processor.

Virtualization may be employed in the computing device 2500 so that infrastructure and resources in the computing device may be shared dynamically. A virtual machine 2514 may be provided to handle a process running on multiple processors so that the process appears to be using only one computing resource rather than multiple computing resources. Multiple virtual machines may also be used with one processor.

A user may interact with the computing device 2500 through a visual display device 2518, such as a computer monitor, which may display one or more user interfaces 2520 that may be provided in accordance with exemplary embodiments. The visual display device 2518 may also display other aspects, elements and/or information or data associated with exemplary embodiments. The computing device 2500 may include other input/output (I/O) devices for receiving input from a user, for example, a keyboard or any suitable multi-point touch interface 2508, a pointing device 2510 (e.g., a mouse). The keyboard 2508 and the pointing device 2510 may be coupled to the visual display device 2518. The computing device 2500 may include other suitable conventional I/O peripherals.

The computing device 2500 may include one or more storage devices 2524, such as a hard-drive, CD-ROM, or other computer readable media, for storing data and computer-readable instructions and/or software that implement exemplary embodiments. The storage device 2524 may include a dynamic grid module 2526 for storing data and computer-readable instructions and/or software that implement and perform methods associated with setting up, configuring and/or re-configuring one or more dynamically configurable barrier grids. The storage device 2524 may include an encoding module 2528 for storing data and computer-readable instructions and/or software that implement and perform methods associated with feeding image data to sequentially adjacent columns of an image display panel associated with a barrier grid. The storage device 2524 may include a decoding module 2530 for storing data and computer-readable instructions and/or software that implement and perform the methods associated with selection of 2D or 3D viewing on an autostereoscopic image display system. The storage device 2524 may include a calibration module 2532 for storing data and computer-readable instructions and/or software that implement and perform the methods associated with calibrating a barrier grid to an image display and/or calibrating an image display to a barrier grid.

Exemplary storage device 2524 may also store one or more databases for storing any suitable information required to implement exemplary embodiments. The databases may be updated by a user or automatically at any suitable time to add, delete or update one or more items in the databases.

The computing device 2500 may include a network interface 2512 configured to interface via one or more network devices 2522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 2512 may include a built-in network adapter, network interface card, PCMCIA network card, card bus network adapter, wireless network adapter, USB network adapter, modem or any other device suitable for interfacing the computing device 2500 to any type of network capable of communication and performing the operations described herein.

The computing device 2500 may run any operating system 2516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 2516 may be run in native mode or emulated mode. In an exemplary embodiment, the operating system 2516 may be run on one or more cloud machine instances.

Figure 26:
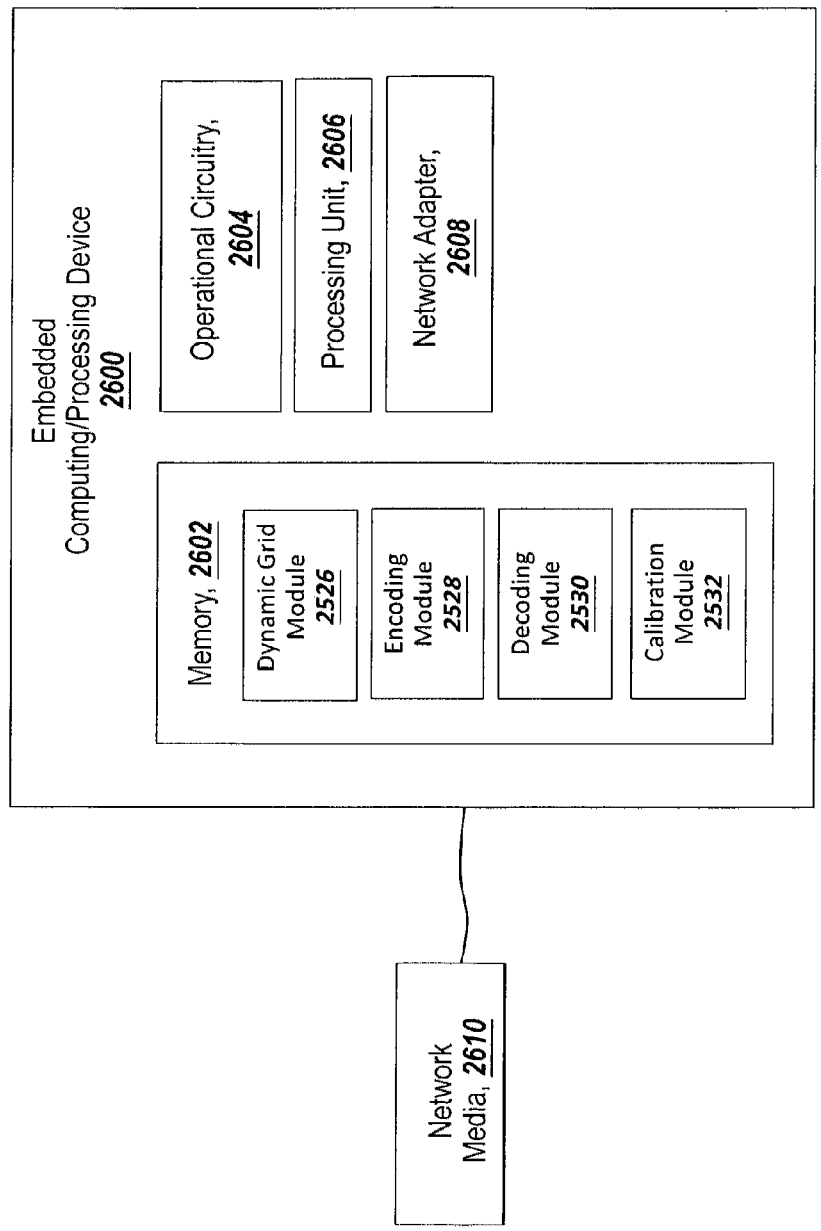
FIG. 26 is a block diagram of an exemplary embedded computing and/or processing device configurable to perform any of the methods and/or to implement any of the systems taught herein.

Exemplary methods may be implemented and executed on one or more embedded computing devices. FIG. 26 is a block diagram of an exemplary embedded computing or processing device 2600 that may be used to perform any of the methods or implement any of the systems and devices provided by exemplary embodiments. The embedded computing device 2600 may be any suitable device incorporating electronics to control operational functions, and in which computing and networking capabilities are embedded. For example, devices in which the computing and networking capabilities may be embedded may include, but are not limited to, audio-video equipment (e.g., audio and video recorders and players, televisions, digital cameras, digital video cameras, compact disks, digital video disks, camcorders, and the like), communication devices (e.g., telephones, cell phones, audio and video conferencing systems, the iPhone™ communication device, the iPad™ communication device, and the like), entertainment devices (e.g., set-top boxes, game consoles, and the like), and the like.

The embedded computing device 2600 may include memory 2602 that includes one or more non-transitory computer-readable media for storing one or more computer-executable instructions or software for implementing exemplary embodiments. The non-transitory computer-readable media may include, but are not limited to, one or more types of hardware memory, non-transitory tangible media, and the like. Memory 2602 may include a computer system memory or random access memory, such as DRAM, SRAM, EDO RAM, and the like. Memory 2602 may include other types of memory as well, or combinations thereof.

Memory 2602 may include a dynamic grid module 2526 for storing data and computer-readable instructions and/or software that implement and perform methods associated with setting up, configuring and/or re-configuring one or more dynamically configurable barrier grids. Memory 2602 may include an encoding module 2528 for storing data and computer-readable instructions and/or software that implement and perform methods associated with feeding image data to sequentially adjacent columns of an image display panel associated with a barrier grid. Memory 2602 may include a decoding module 2530 for storing data and computer-readable instructions and/or software that implement and perform the methods associated with selection of 2D or 3D viewing on an autostereoscopic image display system. Memory 2602 may include a calibration module 2532 for storing data and computer-readable instructions and/or software that implement and perform the methods associated with calibrating a barrier grid to an image display and/or calibrating an image display to a barrier grid.

The embedded computing device 2600 may include operational circuitry 2604 that operate device functions. The embedded computing device 2600 may include one or more processing units 2606 to provide embedded computing capabilities, for example, for setting up and/or configuring a dynamically configurable barrier grid. The processing unit 2606 may execute computer-executable instructions or software for implementing exemplary embodiments, and one or more other programs for controlling system hardware, for example, for setting up and/or configuring a dynamically configurable barrier grid. The processing unit 2606 may have hardware interfaces to the operational circuitry 2604 that operate device functions. The processing unit 2606 may be one or more microprocessors or one or more micro-controllers.

The embedded computing device 2600 may include one or more network adapters 2608 for connecting with a network media 2610 that is interconnected with a computer network. The network adapter 2608 may be a network interface card suitable to the particular network media 2610. For example, exemplary network adapters 2608 may include, but are not limited to, a built-in network adapter, network interface card, PCMCIA network card, card bus network adapter, wireless network adapter, USB network adapter, modem or any other device. The network media 2610 may be any type of wired or wireless network media including, but not limited to, Ethernet, firewire, radio frequency, television cable, Local Area Network (LAN), Wide Area Network (WAN) or the Internet through a variety of connections including, but not limited to, standard telephone lines, LAN or WAN links (for example, 802.26, T1, T3, 56 kb, X.25), broadband connections (for example, ISDN, Frame Relay, ATM), wireless connections, controller area network (CAN), or some combination of any or all of the above.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for calibrating a 3D composite image for display in an autostereoscopic image display system, the method comprising:
    displaying a barrier grid associated with an image display device in the autostereoscopic image display system, the barrier grid configurable to include a plurality of alternating vertical light-transmitting portions and light-blocking portions;
    displaying a calibration image on the image display device;
    variably resizing the calibration image on the image display device;
    determining a brightness of the calibration image cooperatively displayed by the image display device and the barrier grid;
    terminating the variable resizing of the calibration image when the brightness is at or above a predefined minimum level, the predefined minimum level indicating calibration of the calibration image with the barrier grid; and storing resizing settings of the calibration image upon terminating the variable resizing of the calibration image.

2. The method of claim 1, further comprising:
receiving, at an image processing device, a composite image;
resizing the composite image based on the resizing settings; and
displaying the resized composite image on the image display panel for cooperative display with the barrier grid in the autostereoscopic image display system.

3. The method of claim 1, wherein the brightness is determined by a camera spaced from the autostereoscopic image display system.

4. The method of claim 1, wherein the brightness is determined by a photodetector spaced from the autostereoscopic image display system.

5. The method of claim 1, further comprising:
dynamically configuring one or more grid characteristics of the barrier grid.

6. The method of claim 5, further comprising:
determining a brightness of the calibration image on the image display device upon dynamically configuring the one or more grid characteristics of the barrier grid; and
terminating configuration of the one or more grid characteristics of the barrier grid when the brightness is exactly or approximately at or above a predefined minimum level, the predefined minimum level indicating calibration of the barrier grid with the calibration image.

7. The method of claim 1, wherein the calibration image is displayed on the entire image display device.

8. The method of claim 1, wherein the calibration image is displayed on a portion of the image display device.

9. The method of claim 1, wherein variably resizing the calibration image comprises:
changing the horizontal dimension of the calibration image.

10. The method of claim 9, further comprising:
changing the vertical dimension of the calibration image based on the altered horizontal dimension to preserve an aspect ratio of the calibration image.

11. A system for calibrating a 3D composite image for display in an autostereoscopic image display system, the system comprising:
a dynamically configurable barrier grid configurable to include a plurality of alternating vertical light-transmitting portions and light-blocking portions;
an image display device;
a brightness detection device configured to determine a brightness of an image cooperatively displayed by the image display device and the barrier grid; and
a calibration system configured to:
display a calibration image on the image display device,
variably resize the calibration image on the image display device, and
terminate the variable resizing of the calibration image when the brightness of the calibration image, as detected at the brightness detection device, is at or above a predefined minimum level, the predefined minimum level indicating calibration of the calibration image with the barrier grid.

12. The system of claim 11, further comprising:
a storage device for storing resizing settings of the calibration image upon terminating the variable resizing.

13. The system of claim 11, further comprising:
an image processing system configured to:
receive a composite image,
resize the composite image based on the resizing settings, and
display, on the image display device, the resized composite image for cooperative display with the barrier grid in the autostereoscopic image display system.

14. The system of claim 11, further comprising:
a processing system configured to:
dynamically configure one or more grid characteristics of the barrier grid.

15. The system of claim 14, wherein the processing system is further configured to:
determine a brightness of the calibration image on the image display device upon dynamically configuring the one or more grid characteristics of the barrier grid; and
terminate configuration of the one or more grid characteristics of the barrier grid when the brightness is exactly or approximately at or above a predefined minimum level, the predefined minimum level indicating calibration of the barrier grid with the calibration image.

16. One or more non-transitory computer-readable media having encoded thereon one or more computer-executable instructions for a method for calibrating a 3D composite image for display in an autostereoscopic image display system, the method comprising:
displaying a barrier grid associated with an image display device in the autostereoscopic image display system, the barrier grid configurable to include a plurality of alternating vertical light-transmitting portions and light-blocking portions;
displaying a calibration image on the image display device;
variably resizing the calibration image on the image display device;
determining a brightness of the calibration image cooperatively displayed by the image display device and the barrier grid;
terminating the variable resizing of the calibration image when the brightness is at or above a predefined minimum level, the predefined minimum level indicating calibration of the calibration image with the barrier grid; and
storing resizing settings of the calibration image upon terminating the variable resizing.

17. A method for calibrating a dynamically configurable barrier grid for display in an autostereoscopic image display system, the method comprising:
displaying a dynamically configurable barrier grid associated with an image display device in the autostereoscopic image display system, the barrier grid configurable to include a plurality of alternating vertical light-transmitting portions and light-blocking portions;
displaying a calibration image on the image display device;
variably resizing the barrier grid;
determining a brightness of the calibration image cooperatively displayed by the image display device and the barrier grid;
terminating the variable resizing of the barrier grid when the brightness is at or above a predefined minimum level, the predefined minimum level indicating calibration of the barrier grid with the calibration image; and
storing resizing settings of the barrier grid upon terminating the variable resizing.

18. The method of claim 17, further comprising:
variably resizing the calibration image on the image display device;
determining the brightness of the calibration image cooperatively displayed by the image display device and the barrier grid;
terminating the variable resizing of the calibration image when the brightness is at or above a predefined minimum level, the predefined minimum level indicating calibration of the calibration image with the barrier grid; and storing resizing settings of the calibration image upon terminating the variable resizing.

19. A system for calibrating a dynamically configurable barrier grid for display in an autostereoscopic image display system, the system comprising:
- a first image display panel;
- a dynamically configurable barrier grid digitally encoded and renderable on a second image display panel, the barrier grid configurable to include a plurality of alternating vertical light-transmitting portions and light-blocking portions;
- a brightness detection device configured to determine a brightness of an image cooperatively displayed by the first and second image display panels;
- a calibration system programmable to:
  - display a calibration image on the first image display panel,
  - variably resize the barrier grid rendered on the second image display panel, and
  - terminate the variable resizing of the barrier grid when the brightness of the calibration image, as detected at the brightness detection device, is at or above a predefined minimum level, the predefined minimum level indicating calibration of the barrier grid with the calibration image; and
- a storage device for storing resizing settings of the barrier grid upon termination of the variable resizing of the barrier grid.

20. One or more non-transitory computer-readable media having encoded thereon one or more computer-executable instructions for a method for calibrating a dynamically configurable barrier grid for display in an autostereoscopic image display system, the method comprising:
- displaying a dynamically configurable barrier grid associated with an image display device in the autostereoscopic image display system, the barrier grid configurable to include a plurality of alternating vertical light-transmitting portions and light-blocking portions;
- displaying a calibration image on the image display device;
- variably resizing the barrier grid;
- determining a brightness of the calibration image cooperatively displayed by the image display device and the barrier grid;
- terminating the variable resizing of the barrier grid when the brightness is at or above a predefined minimum level, the predefined minimum level indicating calibration of the barrier grid with calibration image; and
- storing resizing settings of the barrier grid upon terminating the variable resizing.

* * * * *